United States Patent
De Sanctis et al.

(10) Patent No.: US 11,463,578 B1
(45) Date of Patent: Oct. 4, 2022

(54) METHOD, SYSTEM AND PROGRAM PRODUCT FOR COMMUNICATING E-COMMERCE CONTENT OVER-THE-AIR TO MOBILE DEVICES

(75) Inventors: Jeanne De Sanctis, New York City, NY (US); Steve Martin, San Francisco, CA (US)

(73) Assignee: Overstock.com, Inc., Midvale, UT (US)

( * ) Notice: Subject to any disclaimer, the term of this patent is extended or adjusted under 35 U.S.C. 154(b) by 120 days.

(21) Appl. No.: 12/392,962

(22) Filed: Feb. 25, 2009

Related U.S. Application Data

(63) Continuation of application No. 11/004,526, filed on Dec. 3, 2004, now abandoned.

(60) Provisional application No. 60/529,688, filed on Dec. 15, 2003.

(51) Int. Cl.
  *H04M 3/42* (2006.01)
  *G06F 7/00* (2006.01)
(52) U.S. Cl.
  CPC ............... *H04M 3/42* (2013.01); *G06F 7/00* (2013.01)
(58) Field of Classification Search
  CPC . H04M 3/32; H04M 3/00; H04M 3/42; G06F 15/00; G06F 15/16; G06F 7/00; G06Q 30/00; H04L 9/00
  See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |
| 4,412,287 | A | 10/1983 | Braddock, III |
| 4,674,044 | A | 6/1987 | Kalmus et al. |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

"SMS". Microsoft Computer Dictionary, 5th Edition. Microsoft Press, Redmond, WA, 2002. Front Matter, pp. 479, 486, and back cover included. ISBN 0-7356-1495-4.*

(Continued)

*Primary Examiner* — Patrick McAtee
*Assistant Examiner* — Nakia Leffall-Allen
(74) *Attorney, Agent, or Firm* — Clayton Howarth, P.C.

(57) ABSTRACT

Product or service information in the form of selected wireless e-commerce content is transmitted from a server to a mobile device, such as mobile telephone or personal digital assistant. The e-commerce content is transmitted either in response to an explicit user request for communication of the e-commerce content, or, in the alternative, is "pushed" to the mobile device as permitted by a user but in the absence of a specific request. The e-commerce content received at the mobile device is presented to a user by the mobile device in textual or graphical format in conjunction with an indication of a communication needed to consummate an e-commerce transaction. If the user desires to purchase the good or service represented by the e-commerce content, the user initiates the communication indicated by the e-commerce content.

8 Claims, 7 Drawing Sheets

(56) References Cited

U.S. PATENT DOCUMENTS

| | | |
|---|---|---|
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A * | 5/1999 | Foladare et al. .............. 370/352 |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,956,640 A | 9/1999 | Eaton et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Coppie et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 * | 3/2002 | Gershman .............. G06Q 40/00 709/219 |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 * | 4/2002 | Sarkki et al. ................. 379/126 |
| 6,374,260 B1 | 4/2002 | Hoffert et al. |
| 6,381,510 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |

(56) References Cited

U.S. PATENT DOCUMENTS

| | | | |
|---|---|---|---|
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar |
| 6,694,436 B1* | 2/2004 | Audebert | G06Q 20/04 |
| | | | 707/999.202 |
| 6,701,310 B1 | 3/2004 | Sugiura et al. |
| 6,718,536 B2 | 4/2004 | Dupaquis |
| 6,725,268 B1 | 4/2004 | Jackel et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2* | 5/2005 | Himmel et al. | 455/456.3 |
| 6,907,401 B1 | 6/2005 | Vittal et al. |
| 6,912,505 B2 | 6/2005 | Linden et al. |
| 6,925,307 B1* | 8/2005 | Mamdani | H04M 3/4938 |
| | | | 455/466 |
| 6,978,273 B1 | 12/2005 | Bonneau et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1* | 7/2006 | Handel et al. | 705/14.39 |
| 7,080,030 B2 | 7/2006 | Eigen et al. |
| 7,099,891 B2 | 8/2006 | Harris et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis |
| 7,254,547 B1 | 8/2007 | Beck et al. |
| 7,305,614 B2 | 12/2007 | Chen et al. |
| 7,318,037 B2 | 1/2008 | Solari |
| 7,324,966 B2 | 1/2008 | Scheer |
| 7,340,249 B2* | 3/2008 | Moran et al. | 455/426.1 |
| 7,349,668 B2* | 3/2008 | Ilan et al. | 455/66.1 |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silbertstein et al. |
| 7,401,025 B1 | 7/2008 | Lokitz |
| 7,447,646 B1 | 11/2008 | Agarwal et al. |
| 7,451,476 B1* | 11/2008 | Banks | H04L 63/105 |
| | | | 455/3.01 |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2* | 2/2009 | Silverstein | G06Q 20/04 |
| | | | 705/26.8 |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1* | 6/2009 | Kamangar | 725/93 |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,904,348 B2 | 3/2011 | Johnson et al. |
| 7,912,748 B1 | 3/2011 | Rosenberg et al. |
| 7,921,031 B2 | 4/2011 | Crysel |
| 7,933,818 B1 | 4/2011 | Kumar et al. |
| 7,941,751 B2 | 5/2011 | Ebert |
| 7,979,340 B2 | 7/2011 | MacDonald Korth et al. |
| 7,983,950 B2 | 7/2011 | DeVita |
| 7,983,963 B2 | 7/2011 | Byrne et al. |
| 8,086,643 B2 | 12/2011 | Tenorio |
| 8,112,303 B2 | 2/2012 | Eglen et al. |
| 8,140,989 B2 | 3/2012 | Cohen et al. |
| 8,166,155 B1 | 4/2012 | Rachmeler et al. |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,265,991 B1 | 9/2012 | Leffert |
| 8,312,056 B1 | 11/2012 | Peng et al. |
| 8,326,662 B1 | 12/2012 | Byrne et al. |
| 8,370,269 B2 | 2/2013 | MacDonald-Korth et al. |
| 8,370,435 B1* | 2/2013 | Bonefas | H04L 41/507 |
| | | | 370/351 |
| 8,392,356 B2 | 3/2013 | Stoner et al. |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,545,265 B2 | 10/2013 | Sakamoto et al. |
| 8,566,170 B1 | 10/2013 | Joseph et al. |
| 8,577,740 B1 | 11/2013 | Murray et al. |
| 8,583,480 B2 | 11/2013 | Byrne |
| 8,584,149 B2 | 11/2013 | Crucs |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 8,817,033 B2 | 8/2014 | Hur et al. |
| 9,047,341 B2 | 6/2015 | Pan |
| 9,047,642 B2 | 6/2015 | Byrne et al. |
| 9,123,069 B1 | 9/2015 | Haynes et al. |
| 9,418,365 B2 | 8/2016 | Groarke et al. |
| 9,430,114 B1 | 8/2016 | Dingman et al. |
| 9,448,692 B1 | 9/2016 | Mierau |
| 9,483,788 B2 | 11/2016 | Martin |
| 9,489,681 B2 | 11/2016 | Barous |
| 9,727,891 B2 | 8/2017 | Mezzacca |
| 9,741,080 B1 | 8/2017 | Byrne |
| 9,747,622 B1 | 8/2017 | Johnson et al. |
| 9,805,425 B2 | 10/2017 | MacDonald-Korth et al. |
| 9,928,752 B2 | 3/2018 | Byrne et al. |
| 9,940,659 B1 | 4/2018 | Behbahani et al. |
| 9,954,879 B1 | 4/2018 | Sadaghiani et al. |
| 10,013,500 B1 | 7/2018 | McClintock et al. |
| 10,074,118 B1 | 9/2018 | Johnson et al. |
| 10,102,287 B2 | 10/2018 | Martin |
| 10,210,518 B2 | 2/2019 | Alnajem |
| 10,217,147 B2 | 2/2019 | Shivaswamy et al. |
| 10,269,081 B1 | 4/2019 | Byrne |
| 10,423,997 B2 | 9/2019 | MacDonald Korth et al. |
| 10,534,845 B2 | 1/2020 | Noursalehi et al. |
| 10,769,219 B1 | 9/2020 | Martin |
| 10,810,654 B1 | 10/2020 | Robertson et al. |
| 10,853,891 B2 | 12/2020 | MacDonald-Korth et al. |
| 10,872,350 B1 | 12/2020 | Hu et al. |
| 10,896,451 B1 | 1/2021 | Johnson et al. |
| 10,929,890 B2 | 2/2021 | Knab et al. |
| 10,949,876 B2 | 3/2021 | Johnson et al. |
| 10,970,463 B2 | 4/2021 | Noursalehi et al. |
| 10,970,769 B2 | 4/2021 | Iqbal |
| 10,977,654 B2 | 4/2021 | Kumar et al. |
| 11,023,947 B1 | 6/2021 | Bosley et al. |
| 11,062,316 B2 | 7/2021 | Bizarro et al. |
| 11,205,179 B1 | 12/2021 | Patel et al. |
| 2001/0002471 A1 | 5/2001 | Ooish |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese et al. |
| 2001/0047290 A1 | 11/2001 | Petras et al. |
| 2001/0047308 A1 | 11/2001 | Kaminsky et al. |
| 2001/0051996 A1* | 12/2001 | Cooper | H04L 63/101 |
| | | | 709/217 |
| 2002/0002513 A1 | 1/2002 | Chiasson |
| 2002/0007321 A1* | 1/2002 | Burton | G06Q 30/0635 |
| | | | 705/51 |
| 2002/0007356 A1 | 1/2002 | Rice et al. |
| 2002/0013721 A1 | 1/2002 | Capel et al. |
| 2002/0019763 A1 | 2/2002 | Linden |
| 2002/0022995 A1 | 2/2002 | Miller et al. |

(56) References Cited

U.S. PATENT DOCUMENTS

| | | |
|---|---|---|
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich et al. |
| 2002/0056044 A1* | 5/2002 | Andersson .......... H04L 63/0428 713/189 |
| 2002/0065774 A1* | 5/2002 | Young ................. G06Q 20/327 705/41 |
| 2002/0099578 A1 | 7/2002 | Eicher et al. |
| 2002/0099579 A1 | 7/2002 | Scelzo et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter |
| 2002/0120537 A1 | 8/2002 | Morea et al. |
| 2002/0120609 A1 | 8/2002 | Lang et al. |
| 2002/0123957 A1 | 9/2002 | Notarius et al. |
| 2002/0124100 A1 | 9/2002 | Adams |
| 2002/0129282 A1* | 9/2002 | Hopkins ...................... 713/201 |
| 2002/0133502 A1 | 9/2002 | Rosenthal |
| 2002/0138399 A1 | 9/2002 | Hayes et al. |
| 2002/0147625 A1 | 10/2002 | Koike, Jr. |
| 2002/0156802 A1* | 10/2002 | Takayama ............ G06Q 20/322 715/234 |
| 2002/0161648 A1 | 10/2002 | Mason et al. |
| 2002/0161664 A1 | 10/2002 | Shaya et al. |
| 2002/0188777 A1 | 12/2002 | Kraft et al. |
| 2002/0194049 A1 | 12/2002 | Boyd |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0007464 A1* | 1/2003 | Balani .................. H04W 4/021 370/310 |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028451 A1* | 2/2003 | Ananian ............ G06Q 30/0615 705/26.42 |
| 2003/0028605 A1* | 2/2003 | Millett et al. ................. 709/206 |
| 2003/0032409 A1* | 2/2003 | Hutcheson ............ H04L 67/306 455/414.1 |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Burk et al. |
| 2003/0088467 A1 | 5/2003 | Culver |
| 2003/0088511 A1* | 5/2003 | Karboulonis et al. .......... 705/39 |
| 2003/0093331 A1 | 5/2003 | Childs et al. |
| 2003/0097352 A1 | 5/2003 | Gutta et al. |
| 2003/0105682 A1 | 6/2003 | Dicker et al. |
| 2003/0110100 A1 | 6/2003 | Wirth, Jr. |
| 2003/0119492 A1* | 6/2003 | Timmins et al. ............. 455/414 |
| 2003/0083961 A1 | 7/2003 | Bezos et al. |
| 2003/0131095 A1 | 7/2003 | Kumhyr et al. |
| 2003/0139969 A1 | 7/2003 | Scroggie et al. |
| 2003/0140007 A1* | 7/2003 | Kramer .................. G06Q 20/04 705/40 |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1* | 10/2003 | Hobday et al. .................. 705/26 |
| 2003/0200156 A1 | 10/2003 | Roseman et al. |
| 2003/0204449 A1 | 10/2003 | Kotas et al. |
| 2003/0217002 A1* | 11/2003 | Enborg ............................ 705/41 |
| 2003/0220835 A1* | 11/2003 | Barnes, Jr. ............ H04M 1/724 705/14.36 |
| 2004/0006509 A1 | 1/2004 | Mannik et al. |
| 2004/0015416 A1 | 1/2004 | Foster et al. |
| 2004/0029567 A1* | 2/2004 | Timmins et al. ............ 455/412.1 |
| 2004/0041836 A1 | 3/2004 | Zaner et al. |
| 2004/0044563 A1 | 3/2004 | Stein |
| 2004/0055017 A1* | 3/2004 | Delpuch et al. ................ 725/110 |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0093311 A1 | 5/2004 | Chew et al. |
| 2004/0107136 A1* | 6/2004 | Nemirofsky et al. ........... 705/14 |
| 2004/0117242 A1 | 6/2004 | Conrad et al. |
| 2004/0122083 A1 | 6/2004 | Lippert et al. |
| 2004/0122681 A1 | 6/2004 | Ruvolo et al. |
| 2004/0122735 A1* | 6/2004 | Meshkin ......................... 705/14 |
| 2004/0122855 A1 | 6/2004 | Ruvolo et al. |
| 2004/0128183 A1 | 7/2004 | Challey et al. |
| 2004/0128283 A1 | 7/2004 | Wang |
| 2004/0128320 A1 | 7/2004 | Grove et al. |
| 2004/0143731 A1* | 7/2004 | Audebert ................ H04L 29/06 713/151 |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1* | 9/2004 | Hutton et al. ............. 379/265.02 |
| 2004/0186766 A1* | 9/2004 | Fellenstein et al. ............ 705/14 |
| 2004/0199496 A1 | 10/2004 | Liu et al. |
| 2004/0199905 A1 | 10/2004 | Fagin et al. |
| 2004/0204989 A1 | 10/2004 | Dicker |
| 2004/0204991 A1 | 10/2004 | Monahan et al. |
| 2004/0230989 A1 | 11/2004 | Macey |
| 2004/0240642 A1* | 12/2004 | Crandell et al. ............. 379/88.22 |
| 2004/0249727 A1 | 12/2004 | Cook, Jr. et al. |
| 2004/0267717 A1 | 12/2004 | Slackman |
| 2005/0010925 A1* | 1/2005 | Khawand et al. ............. 719/310 |
| 2005/0021666 A1* | 1/2005 | Dinnage et al. ............... 709/217 |
| 2005/0038733 A1 | 2/2005 | Foster et al. |
| 2005/0044254 A1* | 2/2005 | Smith ............................. 709/231 |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0144074 A1 | 6/2005 | Fredregill et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0240474 A1 | 10/2005 | Li |
| 2005/0262067 A1 | 11/2005 | Lee et al. |
| 2005/0273378 A1 | 12/2005 | MacDonald-Korth et al. |
| 2005/0278231 A1 | 12/2005 | Teeter |
| 2006/0009994 A1 | 1/2006 | Hogg et al. |
| 2006/0010105 A1 | 1/2006 | Sarukkai et al. |
| 2006/0015498 A1 | 1/2006 | Sarmiento |
| 2006/0031240 A1 | 2/2006 | Eyal et al. |
| 2006/0041638 A1 | 2/2006 | Whittaker et al. |
| 2006/0048093 A1 | 3/2006 | Jain et al. |
| 2006/0058048 A1* | 3/2006 | Kapoor et al. ................ 455/466 |
| 2006/0069623 A1 | 3/2006 | MacDonald Korth et al. |
| 2006/0085251 A1 | 4/2006 | Greene |
| 2006/0100803 A1 | 5/2006 | Fujii |
| 2006/0173817 A1 | 8/2006 | Chowdhury et al. |
| 2006/0206386 A1 | 9/2006 | Walker et al. |
| 2006/0206479 A1 | 9/2006 | Mason |
| 2006/0218049 A1 | 9/2006 | Walker et al. |
| 2006/0224470 A1* | 10/2006 | Garcia Ruano ...... G06Q 20/102 705/26.1 |
| 2006/0230035 A1 | 10/2006 | Bailey et al. |
| 2006/0235752 A1 | 10/2006 | Kavanagh et al. |
| 2006/0259360 A1 | 11/2006 | Flinn et al. |

(56) References Cited

U.S. PATENT DOCUMENTS

| | | |
|---|---|---|
| 2006/0271671 A1 | 11/2006 | Hansen |
| 2006/0282304 A1 | 11/2006 | Hansen |
| 2007/0005424 A1 | 1/2007 | Arauz |
| 2007/0027760 A1 | 2/2007 | Collins et al. |
| 2007/0027814 A1* | 2/2007 | Tuoriniemi ............ G06F 21/10 705/59 |
| 2007/0055568 A1 | 3/2007 | Osborne |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226779 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez |
| 2007/0299743 A1 | 12/2007 | Staib et al. |
| 2008/0010678 A1 | 1/2008 | Burdette et al. |
| 2008/0015938 A1 | 1/2008 | Haddad et al. |
| 2008/0021763 A1 | 1/2008 | Merchant |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0133349 A1 | 6/2008 | Nazer et al. |
| 2008/0140765 A1 | 6/2008 | Kelaita et al. |
| 2008/0162574 A1 | 7/2008 | Gilbert |
| 2008/0195476 A1 | 8/2008 | Marchese et al. |
| 2008/0201218 A1 | 8/2008 | Broder et al. |
| 2008/0215456 A1 | 9/2008 | West et al. |
| 2008/0281714 A1 | 11/2008 | Kluth |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty |
| 2008/0313010 A1 | 12/2008 | Jepson |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0037355 A1 | 2/2009 | Brave et al. |
| 2009/0106080 A1 | 4/2009 | Carrier et al. |
| 2009/0106127 A1 | 4/2009 | Purdy et al. |
| 2009/0110181 A1 | 4/2009 | Koenig |
| 2009/0119167 A1 | 5/2009 | Kendall et al. |
| 2009/0157537 A1 | 6/2009 | Miller |
| 2009/0164323 A1 | 6/2009 | Byrne |
| 2009/0164442 A1 | 6/2009 | Shani et al. |
| 2009/0182589 A1 | 7/2009 | Kendall et al. |
| 2009/0204848 A1 | 8/2009 | Kube et al. |
| 2009/0222337 A1 | 9/2009 | Sergiades |
| 2009/0222348 A1 | 9/2009 | Ransom et al. |
| 2009/0222737 A1 | 9/2009 | Liesche |
| 2009/0228918 A1 | 9/2009 | Rolff et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0146413 A1 | 3/2010 | Phillips |
| 2010/0094673 A1 | 4/2010 | Lobo et al. |
| 2010/0107123 A1 | 4/2010 | Sareen |
| 2010/0145831 A1 | 6/2010 | Esfandiari et al. |
| 2010/0228617 A1 | 9/2010 | Ransom et al. |
| 2011/0010656 A1 | 1/2011 | Mokotov |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0137973 A1 | 6/2011 | Wei et al. |
| 2011/0145226 A1 | 6/2011 | Gollapudi et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston |
| 2011/0191319 A1 | 8/2011 | Nie et al. |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |
| 2011/0271204 A1 | 11/2011 | Jones et al. |
| 2011/0276513 A1 | 11/2011 | Ehart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158480 A1 | 6/2012 | Sundaram |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0203723 A1 | 8/2012 | Huang et al. |
| 2012/0231424 A1 | 9/2012 | Caiman et al. |
| 2012/0233312 A1 | 9/2012 | Ramakumar et al. |
| 2012/0253985 A1 | 10/2012 | Maron et al. |
| 2012/0271702 A1 | 10/2012 | MacLachlan et al. |
| 2012/0278388 A1 | 11/2012 | Kleinbart et al. |
| 2012/0284336 A1 | 11/2012 | Schmidt et al. |
| 2012/0323725 A1 | 12/2012 | Johnston et al. |
| 2013/0031470 A1 | 1/2013 | Daly, Jr. et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenborg |
| 2013/0173408 A1 | 7/2013 | Lindblom |
| 2013/0185164 A1 | 7/2013 | Pottjegort |
| 2013/0191409 A1 | 7/2013 | Zeng |
| 2013/0254059 A1 | 9/2013 | Teo |
| 2013/0268561 A1 | 10/2013 | Christie et al. |
| 2014/0019298 A1 | 1/2014 | Suchet et al. |
| 2014/0019313 A1 | 1/2014 | Hu et al. |
| 2014/0025509 A1 | 1/2014 | Reisz et al. |
| 2014/0032544 A1 | 1/2014 | Mathieu et al. |
| 2014/0095273 A1 | 4/2014 | Tang et al. |
| 2014/0114680 A1 | 4/2014 | Mills et al. |
| 2014/0114755 A1 | 4/2014 | Mezzacca |
| 2014/0136290 A1 | 5/2014 | Schiestl et al. |
| 2014/0172652 A1 | 6/2014 | Pobbathi et al. |
| 2014/0200959 A1 | 7/2014 | Sarb et al. |
| 2014/0259056 A1 | 9/2014 | Grusd |
| 2014/0278880 A1 | 9/2014 | Lemphers et al. |
| 2014/0279191 A1 | 9/2014 | Agarwal et al. |
| 2014/0289005 A1 | 9/2014 | Laing et al. |
| 2014/0372415 A1 | 12/2014 | Fernandez-Ruiz |
| 2015/0019958 A1 | 1/2015 | Ying et al. |
| 2015/0032507 A1 | 1/2015 | Narasimhan et al. |
| 2015/0088695 A1 | 3/2015 | Lorbiecki et al. |
| 2015/0089524 A1 | 3/2015 | Cremonesi et al. |
| 2015/0142543 A1 | 5/2015 | Lellouche |

(56) References Cited

U.S. PATENT DOCUMENTS

| | | | |
|---|---|---|---|
| 2015/0286742 | A1 | 10/2015 | Zhang et al. |
| 2015/0287066 | A1 | 10/2015 | Wortley et al. |
| 2016/0071105 | A1 | 3/2016 | Groarke et al. |
| 2017/0235788 | A1 | 8/2017 | Borisyuk et al. |
| 2017/0300911 | A1 | 10/2017 | Alnajem |
| 2017/0344622 | A1 | 11/2017 | Islam et al. |
| 2018/0167412 | A1 | 6/2018 | Barrett et al. |
| 2019/0066111 | A1 | 2/2019 | Bizarro et al. |
| 2019/0130904 | A1 | 5/2019 | Homma et al. |
| 2019/0295088 | A1 | 9/2019 | Jia et al. |
| 2019/0325868 | A1 | 10/2019 | Lecue et al. |
| 2020/0005310 | A1 | 1/2020 | Kumar et al. |
| 2020/0065357 | A1 | 2/2020 | Noursalehi et al. |
| 2020/0184540 | A1 | 6/2020 | D'Souza et al. |
| 2020/0218766 | A1 | 7/2020 | Yaseen et al. |
| 2020/0250675 | A1 | 8/2020 | Hanis et al. |

FOREIGN PATENT DOCUMENTS

| | | | |
|---|---|---|---|
| EP | 0636993 | | 4/1999 |
| EP | 0807891 | | 5/2000 |
| EP | 1241603 | | 3/2001 |
| GB | 2397400 | | 7/2004 |
| GB | 2424098 | | 9/2006 |
| JP | 2001283083 | | 10/2001 |
| JP | 2002318935 | | 10/2002 |
| JP | 2009505238 | | 2/2009 |
| WO | 97/17663 | | 5/1997 |
| WO | 98/32289 | | 7/1998 |
| WO | 98/47082 | | 10/1998 |
| WO | WO9849641 | | 11/1998 |
| WO | 99/59283 | | 11/1999 |
| WO | 00/25218 | | 5/2000 |
| WO | WO-0068851 A2 * | 11/2000 | ............. G06Q 30/02 |
| WO | 01/09803 | | 2/2001 |
| WO | 01/82135 | | 11/2001 |
| WO | 2001/097099 | | 12/2001 |
| WO | 2002/037234 | | 11/2002 |
| WO | 2003/094080 | | 11/2003 |
| WO | 2007021920 | | 2/2007 |
| WO | WO2007021920 | | 2/2007 |
| WO | 2012/093410 | | 7/2012 |
| WO | WO2015116038 | | 8/2015 |
| WO | WO2015176071 | | 11/2015 |

OTHER PUBLICATIONS

2Roam, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 3, No. 3.

Auctionwatch.com, multiple pages—including search results for "expedition," printed Apr. 21, 2001.

Auctiva.com, multiple pages, undated but website copyright date is "1999-2000.".

Braganza, "Is Research at Cranfield—A Look at the Future," Electronic Markets—The International Journal, Oct. 1993, 1 page, vol. 3, No. 3.

Brecht et al., "The IM 2000 Research Programme," Electronic Market—The International Journal, Oct. 1993, 1 page, vol. 3, No. 3.

Business Wire business editors/high-tech writers, "2Roam Partners With Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for Getting Things Done is on More Wireless Devices, with Ability to Purchase its Products from Anywhere," Business Wire, Oct. 2, 2000.

Business Wire business editors/high-tech writers, "2Roam Drives Hertz to the Wireless Web; Number One Car Rental Company To Provide Customers Wireless Access From Any Device," Business Wire, Aug. 7, 2001.

Buy.Com, www.buy.com homepage, printed Oct. 13, 2004.

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

Friendster.com, homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

IBM, "Anonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

IEEE 100—The Authoritative Dictionary of IEEE Standards Terms, Seventh Edition, 2000. Entire book cited; table of contents, source list, and terms beginning with A included. ISBN 0-7381-2601-2.

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

Kuula, "Telematic Services in Finland," Electronic Markets—The International Journal, Oct. 1993, 1 page, vol. 3, No. 3.

Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.

Lee et al., "Electronic Brokerage and Electronic Auction: The Impact of IT on Market Structures," Proceedings of the 29th Annual Hawaii International COnference on System Sciences, 1996, pp. 397-406.

Lee, "AUCNET: Electronic Intermediary for Used-Car Transactions," Electronic Markets—The International Journal, Dec. 1997, pp. 24-28, vol. 7, No. 4.

LIVE365 press release, "Live365 to Offer Opt-ln Advertising on Its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol. 30, No. 6.

(56) References Cited

OTHER PUBLICATIONS

Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinity, "Build Your Weapon," PC Magazine, Apr. 24, 2011, printed from www.pcmag.com/print_article2/0,1217,a%253D3955,00. asp.
Meade, "Visual 360: a performance appraisal system that's 'fun,'" HRMagazine, 44, 7, 118(3), Jul. 1999.
"MEDIAPPRAISE: Mediappraise Receives National Award For Web-based Technology That Enables Companies To Solve Thorny HR Problem," Dec. 14, 1998.
Medvinsky et al., "Electronic Currency for the Internet," Electronic Markets—The International Journal, Oct. 1993, 2 pages, vol. 3, No. 3.
Metails.Com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "Fast—A Research Project in Electronic Commerce," Electronic Markets—The International Journal, Oct. 1993, 4 pages, vol. 3, No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"Onsale: Onsale Brings Thrill of Auctions and Bargain Hunting Online; Unique Internet retail service debuts with week-long charity auction for The Computer Museum in Boston," May 24, 1995, printed from www.dialogweb.com/cgi/dwclient?dwcommand=DWEBPRINT%20810-489267.
"ONSALE joins fry as online shopping picks up speed: Internet Booms," Computer Reseller News, Jun. 5, 1995, p. 73.
Palm, Inc., Palm™ Web Pro Handbook, copyright 2002-2003.
Post et al., "Application of Auctions as a Pricing Mechanism for the Interchange of Electric Power," IEEE Transactions on Power Systems, Aug. 1995, pp. 1580-1584, vol. 10, No. 3.
Preist et al., "Adaptive agents in a persistent shout double auction," International Conference on Information and Computation, Proceedings of the first international conference on Information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252. vol. 21.
Reck, "Trading-Process Characteristics of Electronic Auctions," Electronic Markets—The International Journal, Dec. 1997, pp. 17-23, vol. 7, No. 4.
Repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case stud of an on-line auction for the World Wide Web," printed from www.nr.no/gem/elcom/publikasjoner/enter98e.html on Jun. 10, 1999, 10 pages.
Turban, "Auctions and Bidding on the Internet: An Assessment," Electronic Markets—The International Journal, Dec. 1997, 5 pages, vol. 7, No. 4.
Ubid.com, "How do 1 Update my Address, Phone, Credit Card, Password, etc.?" printed from web.archive.org/web/20010208113903/www.ubid.com/help/topic13.asp on Aug. 30, 2007.
Ubid.com, "How do I track my shipment?" printed from web.archive.org/web/20010331032659/www.ubid.com/help/topic27.asp on Aug. 30, 2007.
Ubid.com, "Can I track all my bids from My Page?" printed form web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNEWSWIRE, Sep. 23, 2002.
Warbelow et al., "AUCNET: TV Auction Network System," Harvard Business School 9-190-001, Jul. 19, 1989, rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
Xchanger.net, webpage printed from www.auctiva.com/showcase/as_4sale.asp?uid=xchanger, undated but at Teast as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.
Anonymous, Image manipulation (image-editing software and image-manipulation systems)(Seybold Special Report, Part II), Seybold Report on Publishing Systems, May 15, 1995, pS35(9), vol. 24, No. 18.
Ball et al., "Supply chain infrastructures: system integration and information sharing," ACM SIGMOD Record, 2002, vol. 31, No. 1, pp. 61-66.
Berger et al., "Random Ultiple-Access Communication and Group Testing," IEEE, 1984.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.

(56) References Cited

OTHER PUBLICATIONS

Business Wire business editors/high-tech writers, "PictureWorks Technology, Inc. Shows Strong Revenue Growth in Internet Imaging Business," Business Wire, Nov. 10, 1999.

Chen et al., "Detecting Web Page Structure for Adaptive Viewing on Small Form Factor Devices," ACM, May 20-24, 2003.

Icrossing, "Icrossing Search Synergy: Natural & Paid Search Symbiosis," Mar. 2007.

IEEE 100—The Authoritative Dictionary of IEEE Standard Terms, Seventh Edition, 2000. Entire book cited; table of contents, source list, and terms beginning with A included. ISBN 0-7381-2601-2.

Ives et al., "Editor's Comments—MISQ Central: Creating a New Intellectual Infrastructure," MIS Quarterly, Sep. 1994, p. xxxv.

Joshi, "Information visibility and its effect on supply chain dynamics," Ph.D. dissertation, Massachusetts Institute of Technology, 2000 (fig. 4.5; p. 45).

Rose, "Vendors strive to undo Adobe lock-hold," Computer Reseller News, Feb. 5, 1996, n 66669, p. 71(7).

Sen, "Inventory and Pricing Models for Perishable Products," Doctor of Philosophy Dissertation—University of Southern California, Aug. 2000.

Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video.

Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).

Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).

Chen, M. (2007). Knowledge assisted data management and retrieval in multimedia database systems (Order No. 3268643).

Y.K. Choi and S. K. Kim, "An auxiliary reccomendation system for repetitively purchasing items in E-commerce," 2014 International Conference on Big Data and Smart Computing (BIGCOMP), Bangkok, 2014, pp. 96-98. (Year 2014).

S. Kulkarni, A. M. Sankpal, R.R. Mudholkar and Kirankumari, "Recommendation engine: Matching individual/group profiles for better shopping experience," 2013 15th International Conference on Advanced Computing Technologies (ICACT), Rajampet, 2013, pp. 1-6. (Year: 2013).

T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).

Levy, Michael, and Dhruv Grewal. "Supply chain management in a networked economy." Journal Retailing 76.4 (2000): 415-429.

Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.

Ross, David Frederick, Frederick S. Weston, and W. Stephen. Introduction to supply chain management technologies. CRC Press, 2010.

MESSAGE Passing from Wikipedia, archived May 6, 2016, retrieved from https://en.wikipedia.org/wiki/message_passing, 4 pages.

Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).

Nicolle et a., "XML Integration and Toolkit for B2B Applications," by Christophe Nicolle, Kokou Yetongnon, and Jean-Claude Simon, Journal of Database Management, Oct.-Dec. 2003 (Year: 2003).

V. Aksakalli, Optimizing direct response in Internet display advertising, Elsevier, vol. 11, Issue 3, May-Jun. 2012, pp. 229-240. (Year: 2012).

Gallagher et al. A framework for targeting banner advertising on the internet. IEEE, pp. 265-274 (Year: 1997).

Alex, Neil,"Optimizing Search Results in Elasticsearch with Scoring and Boosting", Mar. 18, 2015, Qbox.io, accessed at [https://qbox.io/blog/optimizing-search-results-in-elasticsearch0with-scoring-and-boosting] (year: 2015).

Hybrid algorithms for recommending new items. Cremonesi et al., ResearchGate, Google, (year:2011).

Dubinsky, B., "Uncovering accounts payable fraud by using 'fuzzy matching logic': Part 1," Business Credit 110.3:6 (4), National Association of Credit Management, Mar. 2008, (Year: 2008).

Dubinsky, B., "Uncovering accounts payable fraud by using 'fuzzy matching logic': Part 2," Business Credit 110.4:64(3), National Association of Credit Management, Apr. 2008 (Year:2008).

Qureshi et al. "Taxonomy based Data Marts," by Asiya Abdus Salam Qureshi and Syed Muhammad Khalid Jamal, International Journal of Computer Applications (0975-8887), vol. 60, No. 13, Dec. 2012 (Year: 2012).

Haibin Liu, Vlado Keselj, "Combined mining of Web server logs and web contents for classifying user navigation patterns and predicting users' future requests," Data & Knowledge Engineering, vol. 61, Issue 2, 2007, pp. 304-330 (Year: 2007).

Surnathi et al., "Automatic Recommendation of Web Pages in Web Usage Mining," International Journal on Computer Science and Engineering, vol. 02, No. 09, 2010 (Year: 2010).

\* cited by examiner

METHOD, SYSTEM AND PROGRAM PRODUCT FOR COMMUNICATING E-COMMERCE CONTENT OVER-THE-AIR TO MOBILE DEVICES

CROSS REFERENCE TO RELATED APPLICATION

This is a U.S. non-provisional patent application that is a continuation of co-pending U.S. patent application Ser. No. 11/004,526, filed Dec. 3, 2004, entitled Method, System and Program Product For Communicating E-Commerce Content Over-The-Air To Mobile Devices, which claims priority to and the benefit of U.S. Provisional Patent Application Ser. No. 60/529,688, filed Dec. 15, 2003, titled, Method, System and Program Product For Communicating E-Commerce Content Over-The-Air To Mobile Devices, which are all incorporated herein by reference in their entirety.

BACKGROUND OF THE INVENTION

1. Technical Field

The present invention is directed to data communication and, in particular, to over-the-air or through-the-air communication of e-commerce content to mobile computing devices. Still more particularly, the present invention is directed to methods, systems and program products that enable an e-commerce server to distribute e-commerce content to mobile computing devices, which then present the content to encourage and facilitate a user concluding an e-commerce transaction involving over-the-air or through-the-air communication.

2. Description of Related Art

E-commerce, that is, commercial transactions consummated through electronic communication (e.g., via the World Wide Web (WWW)), is a rapidly expanding segment of the global economy. In a typical e-commerce transaction, a desktop or laptop computer user decides upon a good or service that the user is interested in purchasing and then initiates access to a retailer's or service provider's e-commerce website via the WWW, perhaps after conducting a search for the website with a commercial search engine. After the desired e-commerce website is located, the user searches the website for the desired good or service, either by conducting a search of the website or by paging through the website content. The user may then add the desired product or service to a virtual "shopping cart" that collects the user's intended purchases by selecting a graphical "button" associated with a graphical or textual description of the good or service. After the user indicates that all intended purchases have been added to the virtual "shopping cart," the e-commerce website presents to the user a form into which the user enters and transmits payment information (e.g., a credit card number). Once the payment information is approved, the website presents to the user a confirmation that a transaction is complete and may indicate a delivery schedule or methodology.

The present invention recognizes that, from the perspective of both the e-commerce retailer and the user, the conventional e-commerce paradigm described above has a number of shortcomings. First, for example, commercial transactions are generally limited by the availability of a laptop or desktop computer, as well as network connectivity with the Internet. Even with the advent of publicly available wireless network connectivity (e.g., so called "wireless fidelity" (Wi-Fi)), access to a traditional computer and network connectivity still represents a significant restriction on the conduct of e-commerce. Second, for example, it is undesirable for a user to be forced to search for the goods and services out of the myriads of websites on the WWW. From the user's perspective, the search process can be time consuming and frustrating, and from the retailer's perspective, the retailer would like to ensure that the user finds the retailer's website and not that of a competitor. Third, for example, even if the user locates the user's website, the user may have difficulty locating the desired goods or services on the retailer's website, or the retailer may be out of stock of the desired goods.

These and other shortcomings collectively represent significant impediments to the conduct of e-commerce, which are addressed and overcome by the present invention.

SUMMARY OF THE INVENTION

In view of the foregoing and in accordance with various embodiments of the present invention, selected wireless mobile e-commerce (hereinafter, "m-commerce") content, such as product or service information, is transmitted from a server to a mobile device, such as a mobile telephone or personal digital assistant ("PDA"). In one embodiment, for example, the m-commerce content is transmitted in response to an explicit user request for communication of the m-commerce content. The user is permitted to view an item on his or her mobile device and prompted to make a purchase (e.g., via a "buy" key or selecting an icon or toolbar on the mobile device). In another embodiment, the m-commerce content is "pushed" to the mobile device in the absence of a specific request. For example, such solicitations may occur multiple times per day, prompt the user to browse various "departments" or categories of goods or services, walk a user through a form for shopping, or combinations thereof.

The m-commerce content received at the mobile device can be presented to the user of the mobile device in textual or graphical format in conjunction with an indication of a communication needed to consummate an m-commerce transaction. If the user desires to purchase the good or service represented by the m-commerce content, the user initiates the communication indicated by the m-commerce content. In one embodiment, the present invention uses a wireless, web access protocol (WAP) that allows a user to visit a website via a mobile device and consummate an entire transaction (e.g., with a credit or debit card) through the mobile device.

In another embodiment, the present invention provides a method of facilitating wireless mobile e-commerce. A method, for example, includes permitting users to designate user preferences in a data storage associated with a server having a program product. The user preferences, for example, include contact information for mobile devices and designations of products about which the users are interested in receiving mobile e-commerce content via the mobile devices. The method also includes selecting a product to be featured in a mobile e-commerce content responsive to the user preferences, forming a mobile e-commerce content having a mobile alert that gives users an option to view a graphics-enabled application launched from within the mobile alert such that an application programming interface at the mobile devices interfaces with the data storage and the program product on the server regarding product suppliers to permit access to the mobile devices and product information, selecting a user designating the product by reference to the user preferences in the data storage. transmitting the mobile e-commerce content from the server to the mobile device of the user, soliciting the user with the mobile e-commerce content on the mobile device regarding the product, indicating on the mobile device that a communication is needed from the user to consummate a mobile e-commerce transaction involving the product, and permitting the user to initiate the communication solicited by the mobile e-commerce content if the user desires to purchase the product and complete the mobile e-commerce transaction.

In still another embodiment, the present invention provides a computer server presenting information as a mobile product selection service for mobile on-line product selection by users over a publicly accessible computer network. A computer server, for example, includes a processor, an interface connecting the processor to the publicly accessible computer network for mobile communication with users, and a storage medium containing information about products for selection by users. The processor transmits from the storage medium mobile e-commerce content relating to on-line products from a product selection website to solicit users with the mobile e-commerce content on mobile devices and forming in the storage medium records of the users' responses to the transmitted mobile e-commerce content. The processor further prompts the users on the mobile devices to make purchases of the products in response to the mobile e-commerce content, forms records of user responses on the storage medium, and indicates to each user that a communication from each user is needed to consummate a mobile e-commerce transaction involving the products. The processor further permits the users to initiate the communications solicited by the mobile e-commerce content if the users desire to purchase the products represented by the mobile e-commerce content over the publicly accessible computer network.

In yet another embodiment, the present invention provides a system for providing a mobile product selection service for mobile on-line product selection by users over a publicly accessible computer network. A system, for example, includes a server computer at a site accessible to the computer network. The server computer has a processor, memory coupled to the processor to store operating instructions therein, and a graphical display coupled to the processor for displaying graphical images. Data storage is also accessible to the processor of the server computer and contains database records about product selection. The system also includes a mobile device accessible to the computer network and having a processor, memory coupled to the processor to store software, and receive database records therein, and a graphic display coupled to the processor for displaying graphic images. The system further includes a mobile user interface for interfacing between the processor and the mobile device to provide user access over the computer network to manipulate the stored software and received database records and machine-readable instructions stored in the memory of the server computer for causing the processor to perform in the following operations: transmit from the server computer mobile e-commerce content relating to on-line products from a product selection website to solicit users with the mobile e-commerce content on mobile devices, form at the server computer prompts to the users on the mobile devices to make purchases of the products in response to the mobile e-commerce content, form at the server computer indications to the users that a communication from each user is needed to consummate a mobile e-commerce transaction involving the products, receive at the server computer communications from the mobile devices of the users if the users desire to purchase the products represented by the mobile e-commerce content over the publicly accessible computer network, and form at the server computer on the storage medium a record of the users' responses to the transmitted mobile e-commerce content.

In another embodiment, the present invention provides a computer readable medium that is readable by a computer connected to a publicly accessible computer network to facilitate mobile e-commerce over the computer network with users. A computer readable medium, for example, includes a set of instructions that, when executed by the computer, cause the computer to perform the following operations: transmit from the computer mobile e-commerce content relating to on-line products from a product selection website to solicit users with the mobile e-commerce content on mobile devices, form at the server computer prompts to the users on the mobile devices to make purchases of the products in response to the mobile e-commerce content, form at the server computer indications to the users that a communication from each user is needed to consummate a mobile e-commerce transaction involving the products, receive at the server computer communications from the mobile devices of the users if the users desire to purchase the products represented by the mobile e-commerce content over the publicly accessible computer network, and form at the server computer on the storage medium a record of the users' responses to the transmitted mobile e-commerce content.

In addition, still another embodiment of the present invention provides a computer memory element containing a stored in signal bearing media database. The database, for example, contains the following data in computer readable format: data indicating transmission of mobile e-commerce content to a user of a mobile device that is wireless and the mobile e-commerce content being related to on-line products from a product selection website for transmission to users on a publicly accessible computer network, data indicating solicitation of the user with the mobile e-commerce content on the mobile device regarding a product, data indicating presentation to the user on the mobile device information regarding the product, data indicating a prompt to the user on the mobile device to make a purchase of the product in response to the mobile e-commerce content, data indicating to the user on the mobile device that a communication is needed to consummate a mobile e-commerce transaction involving the product, and data indicating initiative by the user to respond to communication solicited by the mobile e-commerce content if the user desires to purchase the product represented by the mobile e-commerce content.

According to embodiments of methods, program products, and systems of the present invention, an m-commerce server, for example, can advantageously have a client relationship with the mobile device, as understood by those skilled in the art, so that the communication between the server and the mobile device operates like a dedicated link. As such, the user has no need to separately access and search the Internet, enter a domain name or website address, scroll through a plurality of web pages and/or selections on a single page, find a product or service area in which the user is interested, scroll through more product selection screens, locate a product or service in which the user has a desire in purchasing or finding more information on the product or service, and somehow consummate an e-commerce transaction. Consummation of an e-commerce transaction often previously was difficult to accomplish, as the mobile device had no secure and efficient way to enter or receive credit card, debit card, or other payment information. Unlike embodiments of methods, program products, and systems of the present invention, this previous more tedious and time consuming process, for example, discourages users from initiating or consummating an e-commerce transaction via a mobile device, especially in view of a significant use of mobile device being when users are traveling, have little time between or during stops, and have other actions or operations occurring around them. In contrast, embodiments of methods, program products, and systems of the present invention provide enhanced e-commerce solutions with mobile devices so that retailer, wholesalers, or other businesses can reach mobile customers in an efficient and timely manner to receive requests for, selectively solicit, and consummate mobile commerce transactions.

Other features, benefits, and advantages of the present invention will become apparent in the following detailed written description.

BRIEF DESCRIPTION OF THE DRAWINGS

Some of the features, benefits, and advantages of the present invention having been stated, others will become apparent as the description proceeds when taken in conjunction with the accompanying drawings, in which.

DETAILED DESCRIPTION

The present invention now will be described more fully hereinafter with reference to the accompanying drawings in which embodiments of the invention are shown. This invention, however, may be embodied in many different forms and should not be construed as limited to the embodiments set forth and illustrated herein; rather, these embodiments are provided so that this disclosure will be thorough and complete, and will fully convey the scope of the invention to those skilled in the art. Like numbers refer to like elements throughout.

Figure 1:
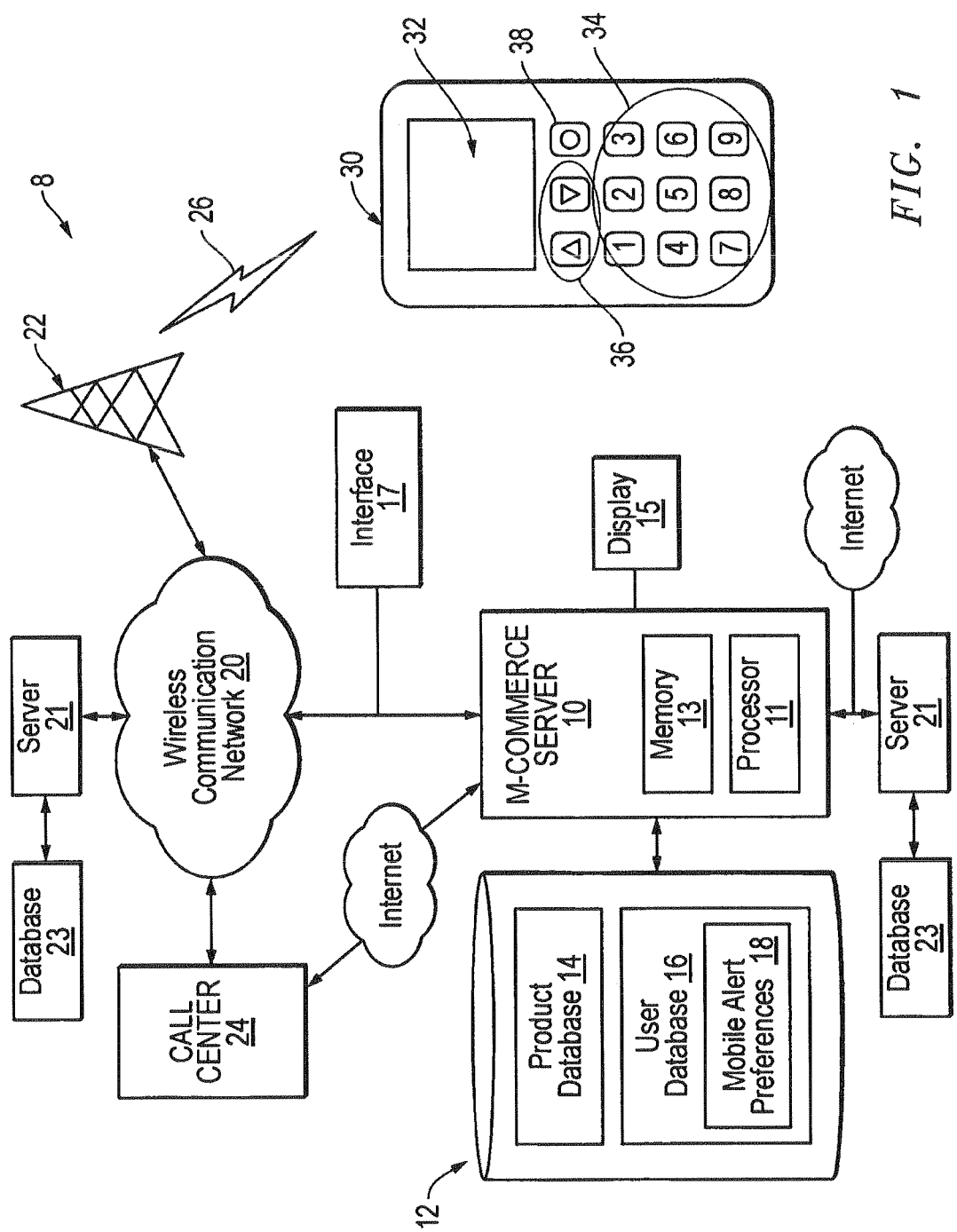
FIG. 1 is a block diagram of a mobile e-commerce system and environment in which the present invention may be practiced.

FIG. 1 illustrates an exemplary mobile e-commerce (herein after, "m-commerce") environment 8 in accordance with an embodiment of the present invention. As shown, the m-commerce environment 8 includes an m-commerce server 10 having associated data storage 12. The data storage 12 includes a product database 14 storing descriptions of a collection of products and/or services (hereinafter, the term "product" may be used to mean product, service, or both) offered for sale. In one embodiment, the product database 14 includes both textual and graphical information (e.g., a photograph) regarding the products and/or services. Products that are themselves capable of expression in digital form (e.g., programs, font sets, photographs, musical works, and movies) can also be stored within the product database 14.

The data storage 12 further includes a user database 16 containing account information for each user authorized to access the m-commerce server 10 to purchase goods and services from among the collection listed in the product database 14. The account information for each user preferably includes at least the user's mobile alert preferences 18.

The mobile alert preferences 18 include at least contact information for at least one registered mobile device (e.g., a telephone number or email address of the mobile device) and can further include a designation of at least one individual or group of products or services about which the user is interested in receiving alerts via the registered mobile device. The m-commerce server 10 accordingly preferably provides a subscriber interface through which the user can utilize a mobile device 30 and/or a conventional computer to designate a product or service of interest to that user. The designation can specify a range or group of products or services (e.g., automobiles, golf clubs, or discounted items) or can identify a specific product or service, for example, by catalog number, SKU, model number, or simply by description. The m-commerce server 10 can also store one or more designations individually for each user or can store such designations for groups of users.

Optionally, the account information stored within the user database 16 for each user can additionally include, for example, a user's login ID and associated password, physical mailing address, e-mail address, and payment information (e.g., bank account or credit card information). In addition, the account information can describe the hardware, software, and/or program products within the user's registered mobile device and a commerce history indicating what products and services have been advertised to the user via the registered mobile device and the user's previous m-commerce purchases.

Figure 7:
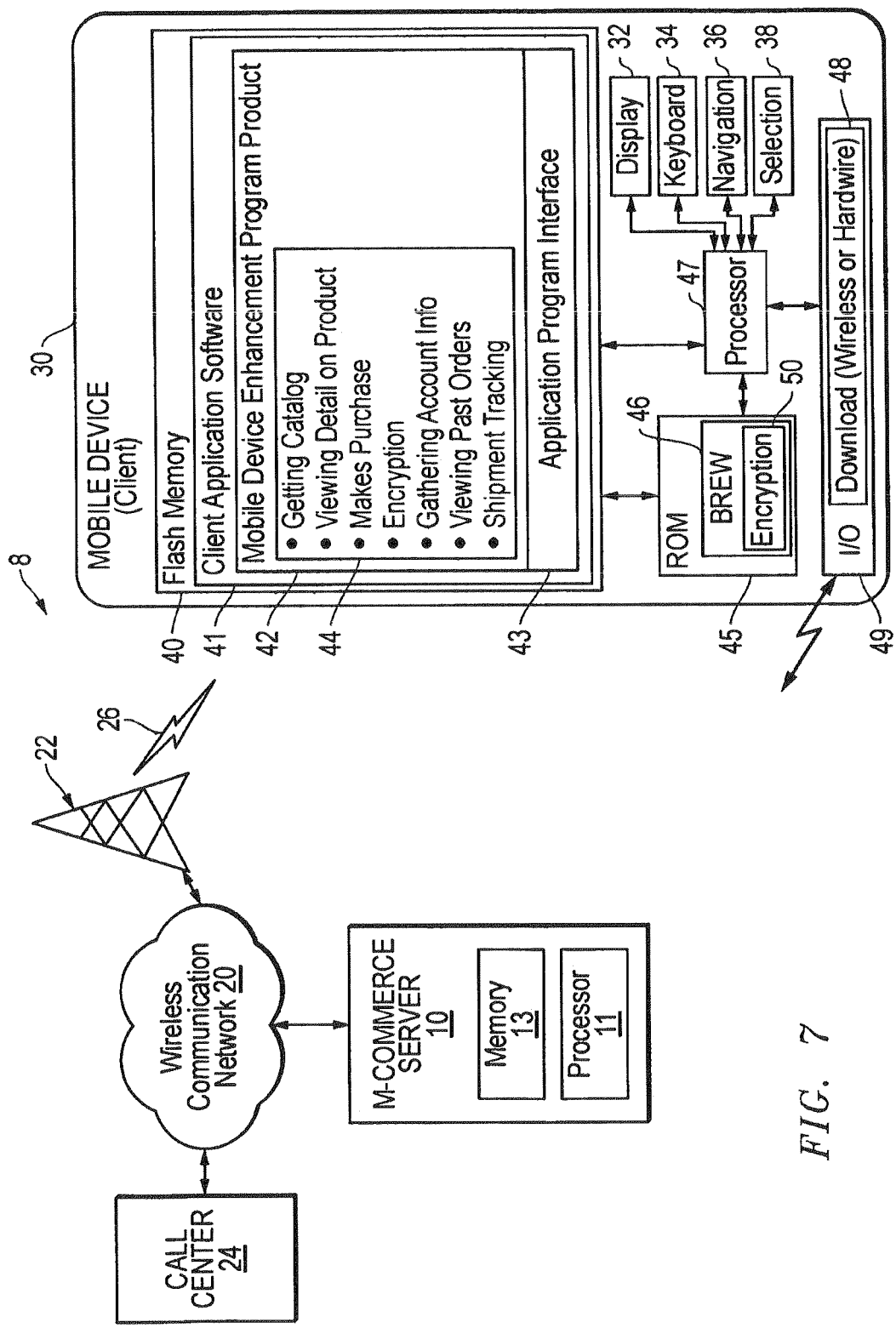
FIG. 7 is a block diagram of a mobile e-commerce system further illustrating communication to a mobile device according to an embodiment of the present invention.

The m-commerce environment 8, as illustrated in FIGS. 1 and 7, further includes one or more mobile devices 30 (only one of which is illustrated). The mobile devices 30 within the m-commerce environment 8 can be implemented with any portable communication device capable of over-the-air or through-the-air radio frequency ("RF") communication, as understood by those skilled in the art, with the m-commerce server 10. For example, the mobile device 30 can be a mobile telephone, an email communication device (e.g., such as those sold under the trademark BLACKBERRY), a personal digital assistant (PDA), or other mobile device. Regardless of the embodiment, each of the mobile devices 30 preferably includes a display 32 (e.g., a liquid crystal display ("LCD")) capable of displaying the textual and/or graphical e-commerce content distributed by the m-commerce server 10.

In addition, in an embodiment in which one or more of the mobile devices 30 includes telephony functionality, the mobile device 30 can include a virtual or physical keypad 34 that, inter alia, can be utilized by the user to enter a destination telephone number, such as that of the call center 24, as described further below. In the illustrated embodiment, the mobile device 30 further includes a navigation device 36, such as arrow buttons, scroll knob, key, or dial, and a selection button 38 (e.g., a "buy" or purchasing key, icon, or toolbar). Arrow buttons 36, for example, can permit a user to navigate a cursor among textual or graphical options presented within the display 32, and depression of selection button 38 indicates user selection of the option designated by the cursor.

In the illustrated embodiment of the m-commerce environment 8 (see FIG. 1), the m-commerce server 10 is coupled (e.g., via the Internet or other link) by a communication network 20, or other communication link as understood by those skilled in the art, which may include one or more data, RF, telephony, satellite, or other over-the-air or through-the-air networks, to a base station system as understood by those skilled in the art, and such as including a cellular communication tower 22. As indicated at reference numeral 26, the m-commerce server 10 employs over-the-air or through-the-air radio frequency communication by a cellular communication tower 22 to distribute to the mobile device 30 e-commerce content representing goods or services listed in the product database 14 associated with the m-commerce server 10 that are available for purchase. Of course, in other embodiments, the e-commerce content can be delivered to the mobile device 30 over-the-air or through-the-air by an earth-orbiting satellite, Wi-Fi antenna, or other radio frequency transmitter. It will further be appreciated by those skilled in the art that the m-commerce server 10 can transmit the e-commerce content to all or only selected ones of the registered mobile devices listed within the mobile alert preferences 18.

In accordance with embodiments of the present invention, the e-commerce content can be transmitted either in response to an explicit user request for communication of the e-commerce content or, in the alternative, can be "pushed" to the mobile device in the absence of a specific request. The e-commerce content received at the mobile device 30 is preferably presented within display 32 in textual or graphical format in conjunction with an indication of a communication need to consummate an e-commerce transaction. If the user desires to purchase the good(s) or service(s) represented by the e-commerce content, the user initiates the communication indicated by the e-commerce content. For example, the user can initiate a wireless voice call from the mobile device 30 via the communication network 20, or otherwise communicate via the Internet, with the call center 24 at which a live or automated attendant concludes an m-commerce transaction with the user. In the alternative, for example, the user can communicate a purchase indication directly to the m-commerce server 10, which automatically concludes the desired m-commerce transaction. Notably, the call center 24 can also access the m-commerce server 10, such as through the Internet, to access additional products in the product database 14 for other desired communication needs to a user.

As perhaps best illustrated in FIGS. 1 and 7, in another example, embodiments of the present invention provide a computer server 10 that serves as a gateway for presenting information as a mobile product selection service for mobile on-line product selection by users over a publicly accessible computer network 20. The computer server 10, for example, includes a processor 11, memory 13, and a display 15, an interface 17 (e.g., an ethernet card) connecting the processor 11 to the publicly accessible computer network 20 for mobile communication with users, and storage medium 12 containing information about products for selection by users. The server 10, for example, also can have access to one or more other separate and remote servers 21 (e.g., for product selection websites), such as retailer, wholesaler, or other business servers having one or more databases 23 associated therewith containing information about products and/or users. This access can be through a global communication network, such as the Internet, a local area network, or other communication link as understood by those skilled in the art. The database 14, for example, can contain a subset of the information contained in one or more databases 23. The server 10 transmits from the storage medium 13 mobile e-commerce content relating to on-line products from, for example, a product selection website to solicit users with the mobile e-commerce content on mobile devices 30 and forms in the storage medium 13 records of the users' responses to the transmitted mobile e-commerce content. The server 10 further prompts the users on the mobile devices 30 to make purchases of the products in response to the mobile e-commerce content and forming records of user responses on the storage medium 12. The server 10 further indicates to each user that a communication from said each user is needed to consummate a mobile e-commerce transaction involving the products.

In addition, the server 10 further permits the users to initiate the communications solicited by the mobile e-commerce content if the users desire to purchase the products represented by the mobile e-commerce content over the publicly accessible computer network 20. Such as shown in FIG. 7, the m-commerce server 10, for example, can advantageously have a client relationship with the mobile device 30, as understood by those skilled in the art, so that the communication between the server 10 and the mobile device 30 operates like a dedicated link. As such, the user has no need to access the Internet, enter a domain name or website address, scroll through a plurality of web pages and/or selections on a single page, find a product or service area in which the user is interested, scroll through more product selection screens, locate a product or service in which the user has a desire in purchasing or finding more information on the product or service, and somehow consummate an e-commerce transaction. Consummation of an e-commerce transaction often previously could not be accomplished, as the mobile device 30 had no secure way to enter or receive credit card, debit card, or other payment information.

Unlike embodiments of methods, program products, and systems of the present invention, this more tedious and time consuming process, for example, discourages users from initiating or consummating an e-commerce transaction via a mobile device, especially in view of a significant use of mobile devices being when users are traveling, have little time between or during stops, and have other actions or operations occurring around them. In contrast, embodiments of methods, program product, and systems of the present invention provide enhanced e-commerce solutions with mobile devices 30 so that retailer, wholesalers, or other businesses can reach mobile customers in an efficient and timely manner to receive requests for, selectively solicit, and effectively consummate mobile commerce transactions.

Figure 2:
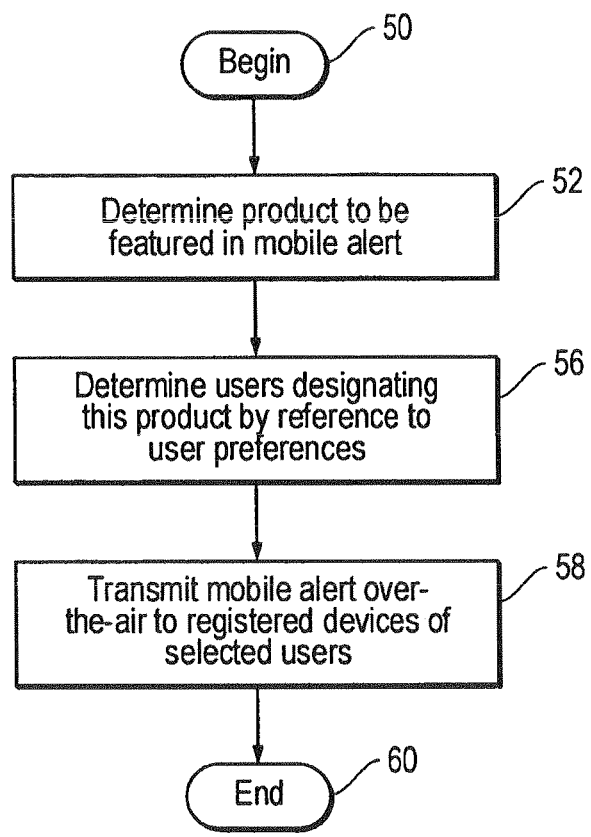
FIG. 2 is a high level logical flowchart of an exemplary process by which an m-commerce server transmits mobile alerts to mobile devices in accordance with the present invention.

FIG. 2 illustrates a high level logical flowchart of a process by which the m-commerce server 10 transmits e-commerce content to mobile devices in a mobile alert in accordance with one embodiment of the present invention. The illustrated process can be executed by the m-commerce server 10 with or without administrative intervention, and can further be executed periodically, for example, daily or weekly. Hereafter, for ease of description, it will be assumed that the mobile alerts feature products rather than services. It will be appreciated by those skilled in the art, however, that the present invention is also applicable to mobile alerts featuring services.

Also, as shown in FIG. 7, and as will be understood by those skilled in the art, the mobile devices 30 can download client application software 41 to be stored in memory, e.g., flash memory 40, of the mobile device 30 and can include mobile device enhancement program product 42 or software and application program interface program product or software from an input/output having download 48, e.g., wireless or hardwire, capabilities associated with the mobile device 30 via a communication link 26 with another computer or the server 10, or be provided with client application program product or software upon purchase of the mobile device, to enhance client communication capabilities to the m-server 10, to enhance GUI displays to the user, and to enhance other features 44 for the user as a set of program instruction as understood by those skilled in the art and as described herein, such as mobile alerts, make purchase consummation, gathering account information, viewing detail on product, viewing past orders, shipment tracking, and security encryption.

As illustrated, the process begins at block 50 and thereafter proceeds to block 52, which illustrates the m-commerce server 10, such as through software stored in the memory 13, determining a particular product(s) within the product database 14 to be featured within a mobile alert. As noted above, the selection of one or more products at block 52 can be performed by a human administrator or can be performed by the m-commerce server 10, for example, based upon a high inventory level, age of inventory, sales history of the product, time of year, and/or other factors. As shown at block 56, the m-commerce server 10 then selects a set of mobile devices 30 to which a mobile alert featuring the selected product(s) will be transmitted. In one embodiment, the mobile devices 30 are selected based upon the mobile alert preferences 18. Because this embodiment of the invention only transmits mobile alerts to users that have subscribed to the mobile alert service and have indicated a preference for receiving information about the featured product(s), user response to receipt of the mobile alert is likely to be favorable.

The process then passes from block 56 to block 58, which illustrates the m-commerce server 10 transmitting an advertisement for the featured product to the mobile devices 30 selected at block 56. The mobile alert preferably includes a description of the product, the price of the product and, optionally, an image or picture of the product and/or the quantity in stock. The mobile alert preferably also includes an indication of a communication that the user can initiate from the mobile device 30 in order to facilitate purchase of the featured product. The mobile alert can be transmitted in a variety of different formats depending upon the bandwidth of the communication technology and the capabilities of the target mobile devices. For example, if the target mobile devices 30 are conventional mobile telephones, the mobile alert can include a Short Message Service (SMS) message. If, however, the target mobile devices are third generation (3G) binary runtime environment for wireless-enabled (BREW-enabled) 46 (such as store in read only memory (ROM) 45 in communication with a processor 47) mobile telephones, as understood by those skilled in the art, the mobile alert can include a graphics-rich "page" in the product database 14 that describes the featured product(s).

Following the transmission of the mobile alert to the selected users, the process depicted in FIG. 2 terminates at block 60.

Figure 3:
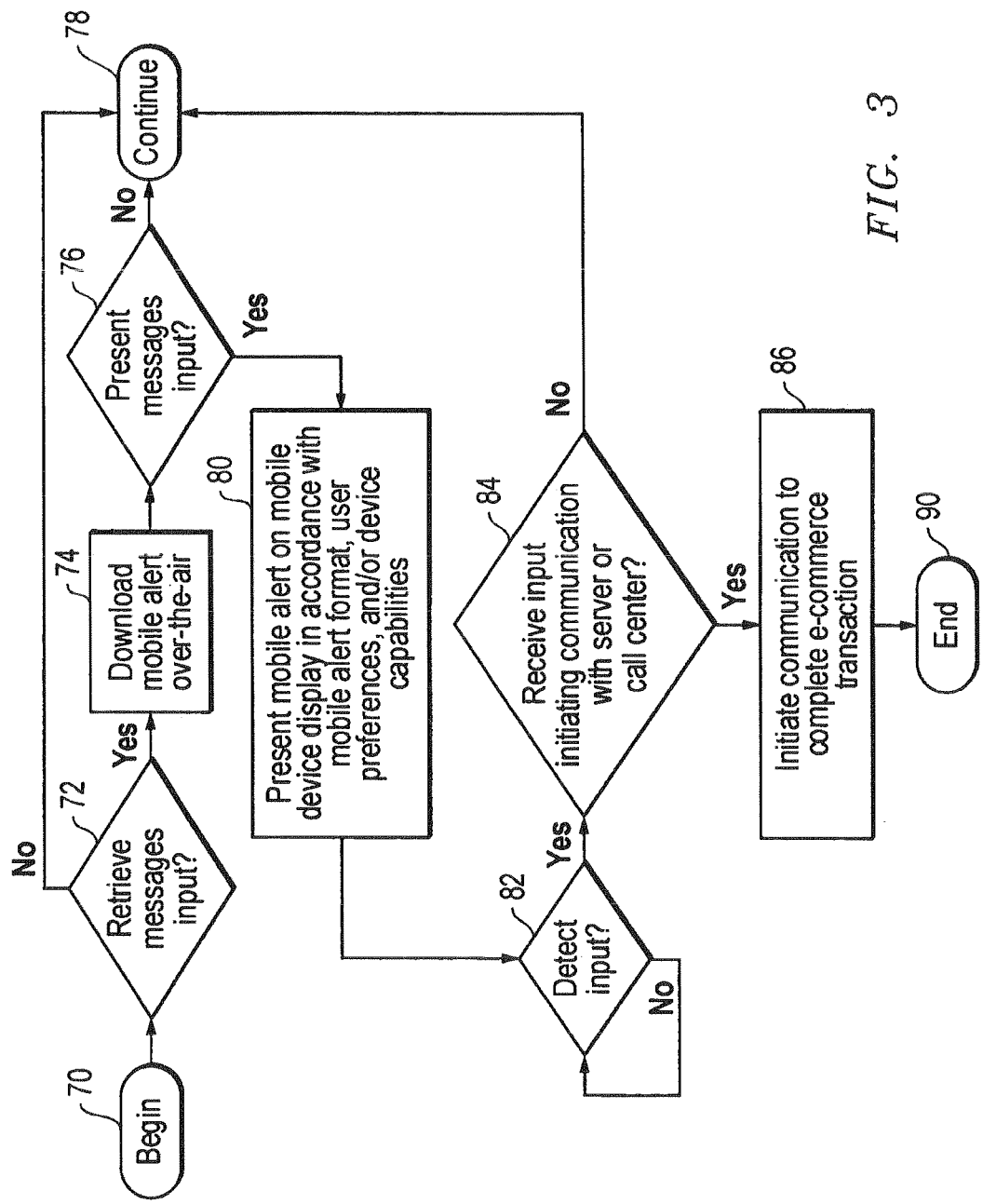
FIG. 3 is a high level logical flowchart of an exemplary process by which a mobile device processes e-commerce content received from an m-commerce server in a mobile alert in accordance with the present invention.

FIG. 3 illustrates a high level logical flowchart of an exemplary process by which the mobile device 30 can process e-commerce content received from the m-commerce server 10 in a mobile alert in accordance with the present invention. For purposes of the following description, it will be assumed that the mobile device 30 is a mobile telephone as understood by those skilled in the art. Modifications to the illustrated process required for other mobile devices, such as an email pager, however, will be apparent to those skilled in the art from the following description.

As illustrated, the process begins at block 70, for example, when a user powers on his or her mobile device 30. For conventional mobile telephones, the transmission of the mobile alert is signaled to the user at power on, for example, by illuminating an LED (Light Emitting Diode) message light or by displaying a text message (e.g., "You have 3 new messages") within display 32. The entire message is pushed to the mobile device when it connects with the network. When a user receives an alert (e.g., via LED, tone, display, or other signal), a new message is ready and already downloaded to the mobile device. Alternatively, in block 72, the mobile device 30 determines whether or not the user has entered a "Read Messages" input to initiate retrieval of the mobile alert from the mobile device's memory. If not, the process passes from block 72 to block 78, which generally represents mobile device 30 performing other processing in accordance with user inputs. In response to a determination at block 72 that the user has entered a "Retrieve Messages" input, the mobile device 30 can download the mobile alert and any other queued message from the wireless communication network utilizing over-the-air or through-the-air communication, as depicted at block 74.

The mobile device 30 next determines at block 76 whether or not the user has entered a "Present Messages" input to invoke presentation of the mobile alert. If not, the process passes from block 76 to block 78, which again represents the mobile device 30 performing other processing in accordance with user inputs. If, however, the mobile device 30 determines at block 76 that the user has entered a "Present Messages" input, the process passes to block 80.

Block 80 illustrates the mobile device 30 presenting the mobile alert within the display 32 in accordance with the format of the mobile alert, and optionally, user preferences and/or the capabilities of the mobile device 30. For example, if the mobile alert is transmitted by the m-commerce server 10 as an SMS message, the mobile device 30 presents the mobile alert within the display 32 in textual format. If, however, the mobile device 30 supports graphical displays (e.g., is BREW-enabled), for example, the mobile device 30 can display a graphical mobile alert (e.g., a photograph of the featured product together with descriptive text) within the display 32. The mobile alert can alternatively be displayed as a textual message having an embedded link that, if selected, causes the mobile device 30 to access an additional graphical "page" regarding the featured product(s) from the product database 14.

In any of these embodiments, the mobile alert preferably includes an indication of a communication that can be initiated by the user utilizing the mobile device 30 in order to purchase the featured product. For example, if the mobile alert is presented in strictly textual format, the textual message can contain a telephone number of call center 24. In an alternative embodiment in which the mobile device 30 supports the display of embedded links within the mobile alert, the mobile alert can contain one or more links that, if selected, cause the mobile device 30 to initiate a voice call to the call center 24 or that cause the mobile device 30 to transmit the telephone number of the mobile device 30 to the call center 24 to request a voice call back. In yet another embodiment, the mobile alert can contain a link that, if selected, initiates communication of a "Make An Immediate Purchase" or other indication message or signal from the mobile device 30 to the m-commerce server 10, indicating the user's desire to buy the featured product.

The process illustrated in FIG. 3 proceeds from block 80 to block 82, which depicts the mobile device 30 iterating until a user input is detected. In response to receipt of a user input, the mobile device 30 determines at block 84 whether or not the user input signifies a command to initiate communication with the m-commerce server 10 or the call center 24. For example, the user can initiate voice communication with the call center 24 by entering a speed dial code, dialing the telephone number of the call center 24 utilizing the keypad 34, or selecting a link displayed within the display 32 utilizing the arrow buttons 36 and the selection button 38. The user can alternatively enter a command initiating data (not voice) communication of a "Make An Immediate Purchase" or other indication message to the m-commerce server 10, for example, by selecting a link displayed in the mobile alert.

If the mobile device 30 determines at block 84 that the detected user input does not signify a command to initiate communication with the call center 24 or the m-commerce server 10, the process passes to block 78, which illustrates the mobile device 30 performing other processing in accordance with the detected user input. If, however, the mobile device 30 detects a user input signifying a command to initiate communication with the call center 24 or the m-commerce server 10, the mobile device 30 initiates the indicated communication at block 86 in order to complete a mobile e-commerce transaction purchasing the featured good. If the communication is a voice call, the user can be required to communicate purchase information, such as a credit card number or bank account information, to a live or automated attendant at the call center 24, either vocally or utilizing keypad 34. Alternatively, if data communication is initiated with the m-commerce server 10, the e-commerce transaction can be concluded by the user transmitting purchase information to the m-commerce server 10 via keypad 34 (e.g., by entering a complete credit card number or by entering a keyed command for the mobile device 30 to access and transmit purchase information pre-stored within the mobile device 30). In such case, it is desirable if the mobile device 30 has a secure communication link, as understood by those skilled in the art, with the m-commerce server 10 in order to protect the user's financial information.

In yet another embodiment in which the purchase information is pre-stored within the user database 16, the communication between the mobile device 30 and the m-commerce server 10 indicates the user's desire to purchase the featured product, but does not contain purchase (i.e., financial) information such as a credit card number. Again, such communication can employ one or more means for protecting users from fraud, such as encryption, password protection, or other techniques (such as personal information (e.g., name, address, and/or telephone numbers) about the registered user) for authenticating the identity of the user and protecting the contents of the data communication. For example, in one embodiment, an application programming interface (API) is used at the mobile device and the mobile e-commerce content is encrypted in Ron's code #4 or Rivest ("RC4") encryption plus elliptical curve as understood by those skilled in the art. Following block 86, the process terminates at block 90.

Below, a particular embodiment of the present invention is described in order to encourage greater understanding of the invention. It should be understood that the below-disclosed embodiment is merely illustrative of the present invention and should not be taken in a limiting sense.

OVERVIEW OF ONE EMBODIMENT

Functionality SMS Alerts can be sent to self-selected members associated with product or service suppliers based on product categories in which they express interest. Once downloaded to the phone, a BREW application can be launched from the text-based SMS message so that the consumer can view more detailed product information, an image of the product, and quantity remaining information directly from existing database(s) of product or service suppliers.

Devices Mobile alerts for product or service suppliers can be available for all U.S. carriers/devices that support SMS. The system, for example, can selectively attempt to support or actually support the majority of the SMS services. A single template for text messages will be developed and used for all carrier/device/category combinations.

The BREW application, for example, can be supported by the following Verizon Wireless phones: Motorola 720, Toshiba 9500, and LG 4400. A single BREW application can be presentable across the varying screen sizes of BREW-enabled devices.

Interfaces The web-based Subscriber Interface can enable members or product or service suppliers to enter basic information about their wireless service and to opt-in for mobile alerts.

The web-based Operator Interface of product or service suppliers can enable supplier personnel to create mobile alert messages.

Application programming interfaces (APIs) to existing relational database and mass email sender of product or service suppliers can allow the Mobile Alert system to get subscriber email addresses and product information.

Features

Consumer Features

Manage My Mobile Alerts After providing username and password, members of product or service suppliers can be able to un/subscribe via the product or service supplier website and can select up to seven daily mobile alerts.

After subscribing for mobile alerts, members can be sent the next regularly scheduled alert(s). Subscription cancellations can be processed as quickly as possible. Members, however, can receive that day's alert, depending on the time of the cancellation relative to the when the mailing list is collected.

Members that opt-in for text alerts, but whose devices or wireless service does not support SMS cannot typically receive messages and cannot typically be notified that they cannot receive alerts.

Members who mistype their telephone number may not be notified by product or service suppliers. Alerts that bounce due to incorrect telephone numbers may not be tracked by the system.

Members with BREW-enabled phones can request SMS messages instead of Product Viewer images.

Download Product Viewer Members of product or service suppliers, for example, can download the BREW-based Daily Deal Viewer over-the-air or through-the-air and via a website. A single BREW application is presentable across the varying screen sizes of BREW devices.

User database tracks which users have downloaded the Daily Deal Viewer and version downloaded Receive Text Alert The subscriber can receive a daily text SMS message with that day's promotion based on the category for which the subscriber has signed up. Product name, brief description of the offer, product price, carrier promotion code, product SKU, and 1-800 number can be included in the text message.

A single template for text messages can be used for all carrier/device/category combinations. In order to support the majority of carriers/devices, SMS message length may be limited to 140 characters, for example.

Call Overstock.com from Text Alert If the subscriber wishes to purchase the item, she can call the 1-800 number included in the SMS message.

If the device/carrier supports calling within a SMS message, the user may call the number directly from the SMS message.

If the subscriber's carrier/device does not support calling from within the SMS application, the user may be required to quit the text message application in order to contact the Overstock.com call center associated with the product or service supplier.

Forward Text Alert Subscribers shall be able to forward a mobile alert. Depending on the carrier/device combination subscribers can be able to forward to a telephone number, an email address, both, or neither.

Launch Product Viewer from Text Alert The SMS message can give the subscriber the option to view a BREW application launched from within the SMS message that can display a supplier logo more detailed product information, an image of the product or service, carrier promotion code and list the quantify of products available, e.g. "ONLY 100 AVAILABLE!" on the promotion of that day. The quantity of product available can be a static number and not a real-time inventory check.

The BREW Daily Deal viewer can be launched from an SMS mobile alert (BREW wake-up based on subscriber selecting a URL) or automatically launched if the mobile telephone is BREW-enabled based on subscriber preference?

Call Overstock.com from Product Viewer The user can purchase the item by calling the supplier's 1-800 number from within the BREW Daily Deal Viewer application.

Daily Deal M-Commerce One-click ordering is also enabled on the website, e.g. credit card number and expiration date saved on the product or service supplier servers. BREW Daily Deal Viewer application includes encryption.

Figure 4:
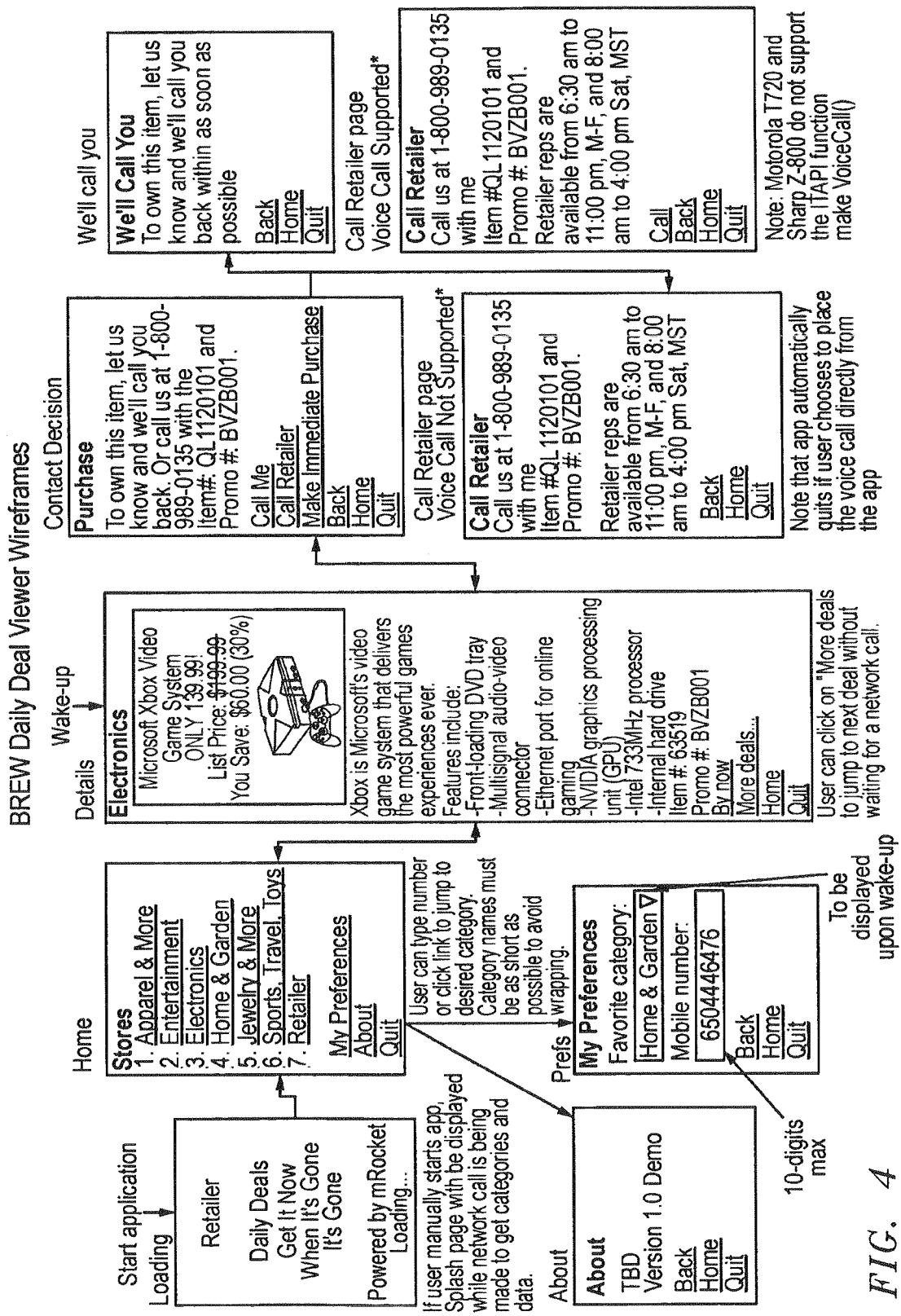
FIG. 4 depicts a sequence of wireframes representing the display of a mobile alert in a graphics-enabled mobile device in accordance with one embodiment of the present invention.

An example of wireframes representing the user's viewing experience when using a BREW-enabled mobile device are depicted in FIG. 4. In this embodiment, the user can launch the Daily Deal Viewer in the absence of a Mobile Alert and view Daily Deals directly from the m-commerce server. Alternatively, the user can launch the Daily Deal viewer from an SMS message. In this embodiment, the user can also initiate a call to the call center 24 or a call back from the call center 24, if supported by the mobile telephone 30. If automatically initiating a call via the makeVoiceCall Internet Telephony API (ITAPI) is not supported by the mobile telephone, the user terminates the Daily Deal Viewer to initiate a regular voice call to the call center.

Operator Features

Create Text Alerts Operator enters Daily Deal information for each product category. A single template for text messages is used for all carrier/device/category combinations.

Save Alert Once the Operator has created a text alert, the data can be saved as a draft. For example, only one draft can be saved for each category.

Preview Text Alerts The Operator is required to preview the text message before publishing it for distribution. The Operator can preview each text alert on a web page. The Operator shall be able to preview both newly created alerts and saved alerts.

Edit Text Alerts Operators shall be able to view saved alerts and edit them prior to the preview/publish process.

Publish Text Alerts By clicking a "Publish" button for each text alert, the Operator indicates that content has been finalized and is ready for distribution to subscribers.

The system automatically suppresses old alerts from the Operator user interface, so only a single alert can be saved for each category at one time.

Operators, for example, may not be able to set publish dates.

The system will not notify the Operator if they forget to publish saved alerts or if they forget to publish all categories.

Product Viewer Presentation Permits operator to preview each Product View for the Daily Deals Manually Launch BREW App If available on the device, the member shall be able to manually start-up the Daily Deal Viewer and view today's Daily Deals.

System and Administrative Features

Send Text Alerts The system shall send all text alerts as emails. The system shall query the relational database to get a list of subscriber email addresses by product category. Text alerts will be automatically sent by the system at TBC each day. The suppliers IT, for example, can change the scheduled send time by updating a system configuration file. Upon completion of the daily send, the system can report the total number of text messages sent for that day.

Pull Product Viewer Data Pull existing product details from relational database.

Rightsize Product Images Sizes product images to correct size for proper display The SMS messages and/or Product Views can be personalized for each user, if desired.

Figure 5:
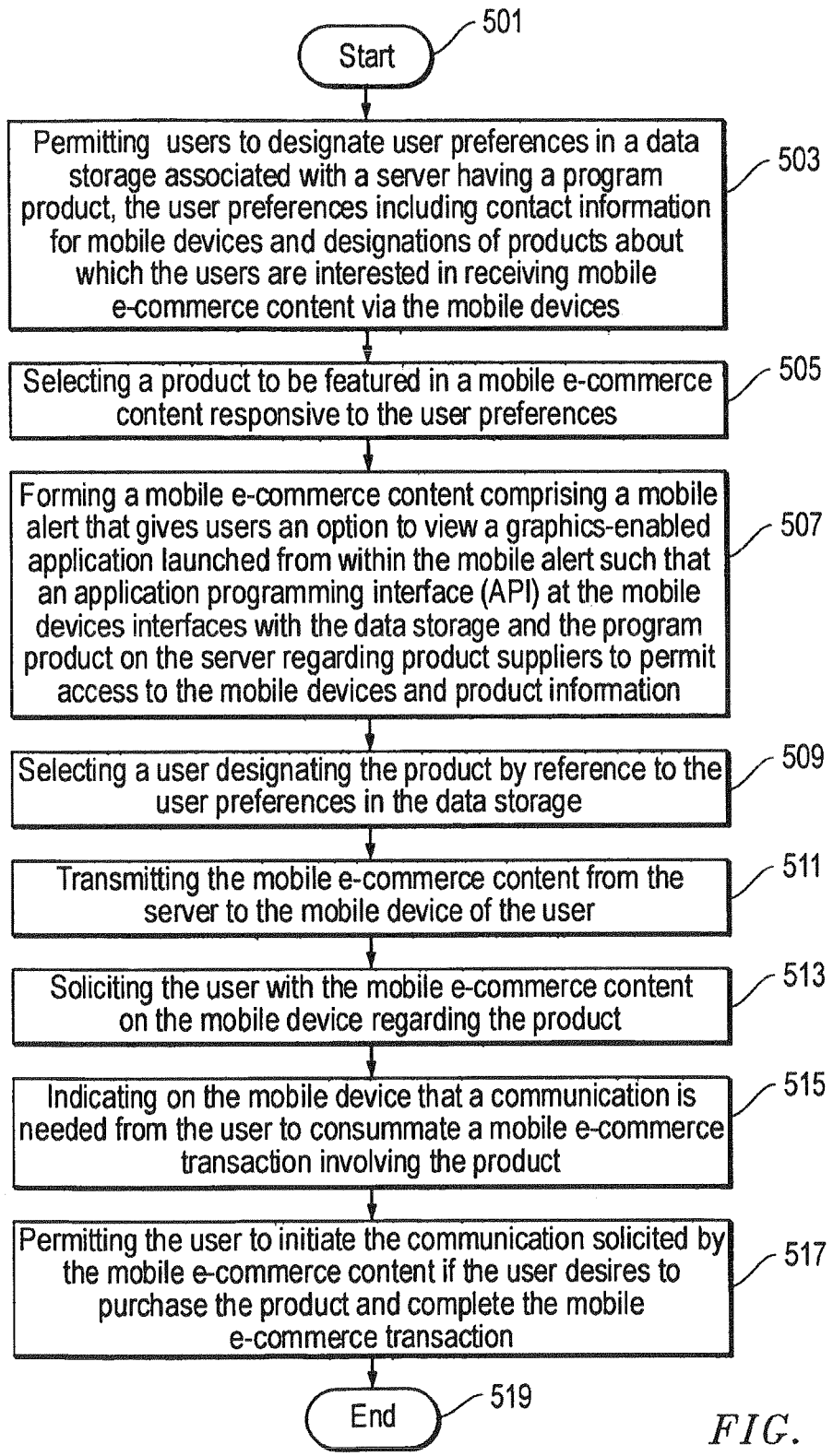
FIG. 5 is a high level logical flowchart of one embodiment of a method of facilitating mobile e-commerce via mobile e-commerce content in accordance with the present invention.

As shown in FIG. 5, one embodiment of a method of facilitating wireless mobile e-commerce constructed in accordance with the present invention starts as indicated at step 501, and permits users to designate user preferences in a data storage (e.g., having one or more databases 14) associated with a server 10 having a program product, as depicted at step 503. The user preferences can include contact information for mobile devices 30 and designations of products about which the users are interested in receiving mobile e-commerce content via the mobile devices 30. As illustrated at step 505, a product is selected and featured in a mobile e-commerce content responsive to the user preferences. A mobile e-commerce content is formed (step 507) and includes a mobile alert that gives users an option to view a graphics-enabled application 41 launched from within the mobile alert such that an application programming interface (API) 43 at the mobile devices 30 interfaces with the data storage 12 and the program product, e.g., stored in the memory 13, on the server 10 regarding product suppliers to permit access to the mobile devices 30 and product information. In one embodiment, the server is an m-commerce server 10 for serving the mobile e-commerce content, and step 507 includes forming the mobile e-commerce content as an SMS message to be sent back to a BREW-enabled mobile device 30. Upon receiving this message, the mobile device 30 prompts the user to view the message. If the user chooses to do this, then a BREW application is opened and the user can view more detailed (e.g., graphical) information about the product mentioned in the initial SMS message. Alternatively, the SMS message gives users the option to view a BREW application launched from within the SMS message such that the API at each of the mobile devices 30 interfaces with the data storage and a mass e-mail sender of product suppliers to permit access to the mobile device 30 and product information.

As depicted at step 509 one or more users are selected who designating the product by reference to the user preferences in the data storage 14. The mobile e-commerce content is transmitted from the server 10 to the mobile device 30 of the user, as illustrated at step 511. The method further can include soliciting the user (step 513) with the mobile e-commerce content on the mobile device 30 regarding the product, indicating on the mobile device 30 that a communication is needed (step 515) from the user to consummate a mobile e-commerce transaction involving the product, and permitting the user to initiate the communication solicited by the mobile e-commerce content (step 517) if the user desires to purchase the product and complete the mobile e-commerce transaction, before ending at step 519.

At step 511, the method also can include making the mobile e-commerce content a type of communication such as an SMS message or e-mail for display to the user on the mobile device 30, a webpage for display to the user on the mobile device 30, or a telephone call to the mobile device 30, and, at step 517, can include receiving a contact from the user selected from the group consisting of an e-mail, a telephone call, and a response wherein the user selects a website link in the mobile e-commerce content. Step 511 also can include transmitting to a mobile device 30 selected from the group consisting of a mobile telephone, an e-mail communication device, and a personal digital assistant. Alternatively, the method can include one of: transmitting in response to an explicit user request for communication of the mobile e-commerce content, and transmitting to the mobile device 30 and soliciting the user in an absence of a specific request for the mobile e-commerce content from the user, and prompting the user to browse selected categories of products.

The method still further can include transmitting a plurality of solicitations to the user for different products and, at step 513, presenting on the mobile device 30 information regarding the product, and prompting the user via the mobile device 30 to make a purchase of the product in response to the mobile e-commerce content. At step 515, the method can include presenting the mobile e-commerce content received at the mobile device 30 to the user of the mobile device 30 in textual or graphical format, and presenting a description, a price, and an image of the product. In addition, at step 517, the method can include prompting the user to actuate a purchasing key on the mobile device 30 to indicate that the user wishes to purchase the product.

The method yet further can include utilizing the server 10 to provide a user interface through which the user can utilize the mobile device 30 to establish a user account having a user login ID and associated password, a shipping address, and payment information, and storing commerce history of the user indicating what products have been solicited to and purchased by the user via the mobile device 30. Moreover, the method can further include permitting the user to forward the mobile e-commerce content from the mobile device 30 to another device that can receive and display the mobile e-commerce content.

Figure 6:
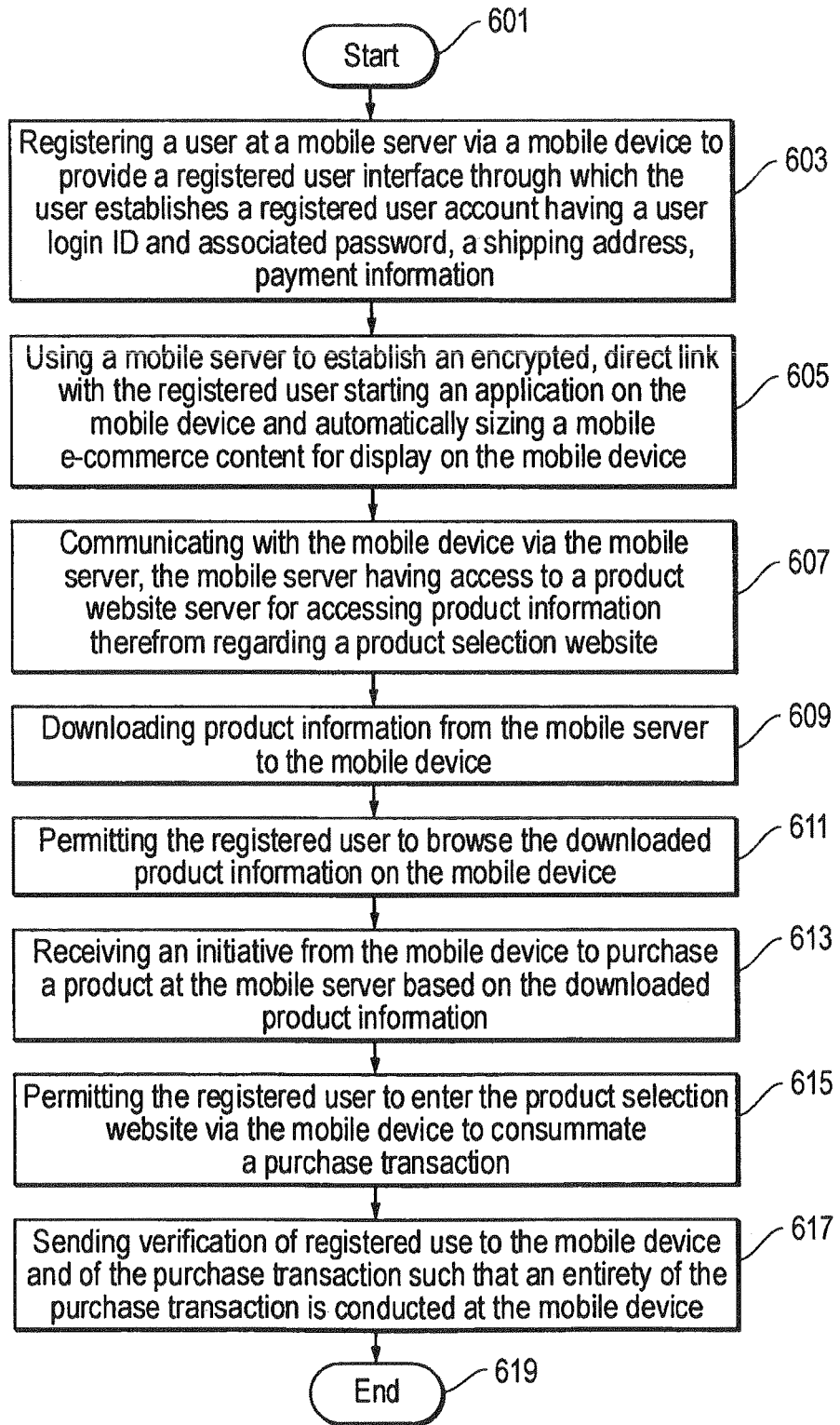
FIG. 6 is a flowchart of a method of facilitating mobile e-commerce according to an embodiment of the present invention.

FIG. 6 illustrates another embodiment of a method of facilitating wireless mobile e-commerce. The method, for example, starts as indicated at step 601, and includes registering a user (step 603) at a mobile server 10 via a mobile device 30 to provide a registered user interface through which the user establishes a registered user account having a user login ID and associated password, a shipping address, payment information. As illustrated at step 605, a mobile server 10 is used to establish an encrypted, direct link with the registered user starting an application on the mobile device 30 and automatically sizing a mobile e-commerce content for display on the mobile device 30. The method also includes communicating with the mobile device 30 via the mobile server (step 607), with the mobile server 10 having access to a product website server for accessing product information therefrom regarding a product selection website. As depicted at step 609, product information is downloaded from the mobile server 10 to the mobile device 30, and (step 611) the registered user is permitted to browse the downloaded product information on the mobile device 30. As illustrated at step 613, the method also includes receiving an initiative from the mobile device 30 to purchase a product at the mobile server 10 based on the downloaded product information; permitting the registered user to enter the product selection website via the mobile device 30 to consummate a purchase transaction (step 615), and sending verification of registered use to the mobile device 30 and of the purchase transaction such that an entirety of the purchase transaction is conducted at the mobile device 30 (step 617), before ending at step 619.

The method can still further include the steps of tracking a shipment of the product with the mobile server 10, and sending information regarding the purchase transaction to the product website server 21. Step 605 may include utilizing an application programming interface at the mobile device 30 and encrypting the mobile e-commerce content, while step 609 can include browsing images, data, and pricing for products. Step 605 also can include transmitting to a mobile device 30 selected from the group consisting of an e-mail communication device, a personal digital assistant, and a mobile telephone, and making the mobile e-commerce content a type of communication selected from the group consisting of an e-mail for display on the mobile device 30, a webpage for display on the mobile device 30, and a telephone call to the mobile device 30. Step 613 also can include receiving a contact from the registered user selected from the group consisting of an e-mail, a response wherein the registered user selects a website link in the mobile e-commerce content, and a telephone call. Alternatively, step 605 can include one of transmitting the mobile e-commerce content to the mobile device 30 in response to an explicit request from the registered user for communication of the mobile e-commerce content, transmitting the mobile e-commerce content to the mobile device 30 and soliciting the registered user in absence of a specific request for the mobile e-commerce content from the registered user.

The method yet also can include the step of selecting the product to be featured in the mobile e-commerce content, and permitting the registered user to designate user preferences that include contact information for at least one registered mobile device 30, and to designate at least one group of products about which the registered user is interested in receiving mobile alerts via the at least one registered mobile device 30. In addition, the mobile e-commerce content can include an SMS message that gives the registered user an option to view a BREW application launched from within the SMS message, and an application programming interface at the mobile device 30 interfaces with a data storage 14 associated with the mobile server 10 and a mass e-mail sender of product suppliers to permit access to an e-mail address of the registered user and product information.

It will be appreciated that the foregoing m-commerce paradigm as illustrated in FIGS. 1-7, and as described herein, presents revenue opportunities for the carrier of the wireless communication in that the retailer can offer a percentage of sales or fixed fee based on a purchase to the wireless communication in exchange for directing traffic to the retailer. The wireless carrier can further incentivize its customers to subscribe to the Mobile Alert service by offering discounted communication services for subscribers to the Mobile Alert service. In another embodiment, for example, a finder's fee can be allocated from the retailer to the carrier for facilitating commercial traffic to the retailer. Such fees can be incremental based on the level of interest of the consumers (e.g., mere inquiries via "clicking," pass-through to purchase).

Although the invention has been particularly shown as described with reference to described embodiments, it will be understood by those skilled in the art that various changes in form and detail can be made therein without departing from the spirit and scope of the invention. For example, it will be appreciated that the concepts disclosed herein can be extended or modified to apply to other types of configuration constructs having different rules than the particular exemplary embodiments disclosed herein. In addition, the present invention is not limited to current networks and carriers. As new wireless technologies are developed, the present invention may be applied to those technologies with substantially no or minimal alteration.

In addition, although aspects of the present invention have been described with respect to a computer system or server executing software that directs the functions of the present invention, it should be understood by those skilled in the art that present invention can alternatively be implemented as a program product for use with a data processing system. Programs defining the functions of the present invention, for example, can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

In the drawings and specification, there have been disclosed typical embodiments of the invention and, although specific terms are employed, they are used in a generic and descriptive sense only and not for the purpose of limitation, the scope of the invention being set forth in the following claims.

That claimed is:

1. A method of facilitating wireless mobile e-commerce, the method comprising:
   (a) storing descriptions of and information about a collection of products and services offered for sale by an e-commerce website in an electronic storage medium accessible to an m-commerce server, said stored product information and descriptions comprising a product database;
   (b) storing at the m-commerce server information about one or more users, including information about the capabilities of the user's mobile device, specifically whether the mobile device is Binary Runtime Environment for Wireless (BREW)-enabled, and pre-stored purchase information for the user;
   (c) establishing a server-client relationship between the m-commerce server and each wireless mobile device that is BREW-enabled wherein the server-client relationship is established by allowing the wireless mobile device to download client application software from the m-commerce server, wherein said client application software is a Binary Runtime Environment for Wireless (BREW) based application which can be launched from a text-based SMS messenger, wherein said client application creates a dedicated link between the mobile device and the m-commerce server, wherein said client application software accesses the m-commerce server without requiring the user to separately access and search the internet, wherein the m-commerce server has access to a user's pre-stored purchase information;
   (d) authorizing each user to access the m-commerce server to purchase goods and services by way of a subscriber interface;
   (e) receiving at the m-commerce server an explicit user request for mobile e-commerce content, the explicit user request comprising a designation of a product of interest to a user, wherein the designation of a product of interest is stored in the m-commerce server;
   (f) causing the m-commerce server to select product information responsive to the explicit user request from the product database using software stored in memory in the m-commerce server;
   (g) causing the m-commerce server, using the software stored in the memory in the m-commerce server, to form mobile e-commerce content regarding a designated product of interest by creating a communication responsive to the with the product information responsive to the designation of a product of interest selected at the m-commerce server, wherein said mobile e-commerce content comprises a text-based SMS alert containing basic product information responsive to the designation of a product of interest user request with the option for a user with a BREW-enabled device to launch an information page containing additional product information in the BREW-based client application software;
   (h) causing the m-commerce server to transmit the mobile e-commerce content from the m-commerce server to the wireless mobile device of each user requesting information regarding a designated product of interest using a communication network, wherein the mobile e-commerce content BREW-based client application software also comprises a purchase feature offering a user of a wireless mobile device the choice to purchase the product of interest featured in the selected product information and further comprises an indication of a communication required to be made from the wireless mobile device to the m-commerce server to indicate the user's desire to buy the product featured in the selected product information; wherein the communication required to be made from a BREW-enabled wireless mobile device is made via the, secured, dedicated link in the BREW-based client application; and wherein the communication required to be made from a non BREW-enabled wireless mobile device is a means of confirming the user's identity and granting permission to use the pre-stored purchase information to consummate the transaction;

(i) displaying, on a display of the wireless mobile device, a solicitation to the user that includes the mobile e-commerce content, wherein the e-commerce content comprises the selected product information, and an offer to a user of a wireless mobile device which gives the user the choice to purchase the product of interest featured in the selected product information, and the indication of the communication required to be made from the wireless mobile device to the m-commerce server to indicate a user's desire to buy the product featured in the selected product information via the wireless mobile device, and initiating an indication message or signal from the wireless mobile device to the m-commerce server indicating the user's desire to buy the product featured in the selected product information; wherein the indication message from a BREW-enabled wireless mobile device is sent via the secured, dedicated link in the BREW-based client application and the indication message from a non-Brew-enabled wireless mobile device is an indication of the user's permission to use the pre-stored purchase information; and pre-stored purchase information;

(j) using the m-commerce server, the stored user information, and the mobile device to consummate a mobile e-commerce transaction for a product featured in the selected product information; wherein the mobile e-commerce transaction is consummated on a BREW-enabled wireless mobile device using the pre-stored purchase information and the secured dedicated link in the BREW-based client application in response to a data communication from the wireless mobile device indicating the user's desire to purchase the product featured in the selected product information; and wherein the mobile e-commerce transaction is consummated on a non-BREW-enabled wireless mobile device using a data communication from the wireless mobile device which employs one or more means for authenticating the identity of the user and uses the pre-stored purchasing information on the m-commerce server.

2. The method as defined in claim 1, wherein said designation specifies one of a range of products and a group of products.

3. The method as defined in claim 1, wherein said designation identifies a specific product.

4. The method as defined in claim 1, wherein said designation comprises a description of a product.

5. The method as defined in claim 1, wherein said designation comprises one of an SKU, a catalog number, and a model number.

6. The method as defined in claim 1, wherein the product featured in the selected product information comprises a plurality of products and wherein step (f) comprises causing the m-commerce server to select product information for the plurality of products to be featured in the mobile e-commerce content responsive to the explicit user request and wherein step (i) comprises displaying, on a display of the wireless mobile device, a solicitation to the user of the wireless mobile device with the mobile e-commerce content on the display of the wireless mobile device regarding the plurality of products.

7. The method as defined in claim 1, wherein step (i) comprises the m-commerce server receiving an SMS message from the user regarding the mobile e-commerce transaction for the product.

8. The method as defined in claim 1, wherein said explicit user request is in a form of an SMS message.

* * * * *